United States Patent
Gerace et al.

(10) Patent No.: US 10,510,043 B2
(45) Date of Patent: Dec. 17, 2019

(54) COMPUTER METHOD AND APPARATUS FOR TARGETING ADVERTISING

(75) Inventors: Thomas A. Gerace, Boston, MA (US); Russell G. Barbour, Natick, MA (US)

(73) Assignee: Skyword Inc., Boston, MA (US)

(*) Notice: Subject to any disclaimer, the term of this patent is extended or adjusted under 35 U.S.C. 154(b) by 581 days.

(21) Appl. No.: 11/451,995

(22) Filed: Jun. 12, 2006

(65) Prior Publication Data
US 2006/0282328 A1 Dec. 14, 2006

Related U.S. Application Data

(63) Continuation-in-part of application No. 11/371,462, filed on Mar. 9, 2006.
(Continued)

(51) Int. Cl.
*G06Q 30/00* (2012.01)
*G06Q 10/10* (2012.01)
(Continued)

(52) U.S. Cl.
CPC ......... *G06Q 10/10* (2013.01); *G06F 16/9535* (2019.01); *G06Q 30/02* (2013.01);
(Continued)

(58) Field of Classification Search
CPC .................................................... G06Q 30/00
See application file for complete search history.

(56) References Cited

U.S. PATENT DOCUMENTS

| | | |
|---|---|---|
| 4,659,314 A | 4/1987 | Weinblatt |
| 4,718,106 A | 1/1988 | Weinblatt |

(Continued)

FOREIGN PATENT DOCUMENTS

| | | |
|---|---|---|
| CA | 2 605 995 A1 | 11/2006 |
| CN | 1575470 A | 2/2005 |

(Continued)

OTHER PUBLICATIONS

Green, Heather. "Making Social Networks Profitable: Google's new approach could offer advertisers coveted online communities," BusinessWeek, Sep. 25, 2008 [retrieved on Sep. 30, 2008]. Retrieved from the Internet URL: http://www.businessweek.com/print/magazine/content/08_40/b4102050681705.htm.
(Continued)

*Primary Examiner* — Naresh Vig
(74) *Attorney, Agent, or Firm* — Hamilton, Brook, Smith & Reynolds, P.C.

(57) ABSTRACT

A host computer site of a computer-based social network of users profiles users for targeting advertisements. The system obtains and/or infers demographic information from end-users using on-line means. The system next monitors end user activity and determines keywords therefrom. The system profiles an end user as a function of the determined end-user activity keywords and obtained/inferred end-user demographic information. Profiles of end-users are matched against targeted profiles of advertisements which are defined by respective advertisers. Using observed user behavior and other factors, ads are prioritized for selection and viewing placement. This results in (i) targeting advertisements to end-users based on end user profiles, and (ii) real-time customization of web pages viewed by end-users.

49 Claims, 25 Drawing Sheets

Related U.S. Application Data

(60) Provisional application No. 60/690,005, filed on Jun. 13, 2005, provisional application No. 60/734,690, filed on Nov. 8, 2005.

(51) Int. Cl.
  *G06Q 30/02* (2012.01)
  *G06F 16/9535* (2019.01)

(52) U.S. Cl.
  CPC ..... *G06Q 30/0204* (2013.01); *G06Q 30/0269* (2013.01); *G06Q 30/0273* (2013.01)

(56) References Cited

U.S. PATENT DOCUMENTS

| | | | |
|---|---|---|---|
| 4,930,011 A | 5/1990 | Kiewit | |
| 5,260,778 A | 11/1993 | Kauffman et al. | |
| 5,446,919 A | 8/1995 | Wilkins | |
| 5,504,675 A | 4/1996 | Cragun et al. | |
| 5,515,098 A | 5/1996 | Carles | |
| 5,636,346 A | 6/1997 | Saxe | |
| 5,848,396 A | 12/1998 | Gerace | |
| 5,974,398 A * | 10/1999 | Hanson et al. | 705/14 |
| 5,991,735 A | 11/1999 | Gerace | |
| 6,009,410 A * | 12/1999 | LeMole | G06Q 30/02 705/14.54 |
| 6,141,010 A | 10/2000 | Hoyle | |
| 6,161,142 A | 12/2000 | Wolfe et al. | |
| 6,275,811 B1 * | 8/2001 | Ginn | 705/14.41 |
| 6,285,987 B1 | 9/2001 | Roth et al. | |
| 6,345,293 B1 | 2/2002 | Chaddha | |
| 6,366,298 B1 | 4/2002 | Haitsuka et al. | |
| 6,374,237 B1 | 4/2002 | Reese | |
| 6,377,936 B1 | 4/2002 | Henrick et al. | |
| 6,411,950 B1 * | 6/2002 | Moricz et al. | |
| 6,496,857 B1 | 12/2002 | Dustin et al. | |
| 6,513,052 B1 | 1/2003 | Binder | |
| 6,516,338 B1 | 2/2003 | Landsman et al. | |
| 6,539,375 B2 | 3/2003 | Kawasaki | |
| 6,606,644 B1 | 8/2003 | Ford et al. | |
| 6,628,314 B1 | 9/2003 | Hoyle | |
| 6,631,360 B1 | 10/2003 | Cook | |
| 6,654,725 B1 | 11/2003 | Langheinrich et al. | |
| 6,687,737 B2 | 2/2004 | Landsman et al. | |
| 6,725,203 B1 | 4/2004 | Seet et al. | |
| 6,757,740 B1 | 6/2004 | Parekh et al. | |
| 6,763,334 B1 | 7/2004 | Matsumoto et al. | |
| 6,778,982 B1 * | 8/2004 | Knight et al. | 707/3 |
| 6,785,659 B1 | 8/2004 | Landsman et al. | |
| 6,804,659 B1 | 10/2004 | Graham et al. | |
| 6,829,780 B2 | 12/2004 | Kraft et al. | |
| 6,839,680 B1 | 1/2005 | Liu et al. | |
| 6,845,396 B1 | 1/2005 | Kanojia et al. | |
| 7,395,499 B2 | 7/2008 | Lane et al. | |
| 7,614,081 B2 | 11/2009 | Prohel et al. | |
| 7,797,345 B1 * | 9/2010 | Martino et al. | 707/792 |
| 7,822,631 B1 | 10/2010 | Vander Mey et al. | |
| 8,538,810 B2 * | 9/2013 | Fox | G06Q 30/0257 705/14.49 |
| 2001/0021914 A1 | 9/2001 | Jacobi et al. | |
| 2001/0047290 A1 | 11/2001 | Petras et al. | |
| 2002/0059201 A1 * | 5/2002 | Work | 707/3 |
| 2002/0165771 A1 | 11/2002 | Walker et al. | |
| 2003/0080997 A1 | 5/2003 | Fuehren et al. | |
| 2004/0073482 A1 | 4/2004 | Wiggins et al. | |
| 2004/0103024 A1 * | 5/2004 | Patel et al. | 705/14 |
| 2004/0172324 A1 | 9/2004 | Merriman et al. | |
| 2004/0172331 A1 | 9/2004 | Merriman et al. | |
| 2004/0172332 A1 | 9/2004 | Merriman et al. | |
| 2004/0215509 A1 | 10/2004 | Perry | |
| 2004/0215515 A1 | 10/2004 | Perry | |
| 2004/0260792 A1 | 12/2004 | Speicher | |
| 2005/0021750 A1 | 1/2005 | Abrams | |
| 2005/0022013 A1 | 1/2005 | Schwenk | |
| 2005/0131762 A1 | 6/2005 | Bharat et al. | |
| 2005/0131894 A1 * | 6/2005 | Vuong | 707/5 |
| 2005/0171832 A1 * | 8/2005 | Hull et al. | 705/10 |
| 2005/0201290 A1 * | 9/2005 | Vasudev et al. | 370/238 |
| 2005/0203801 A1 * | 9/2005 | Morgenstern et al. | 705/14 |
| 2005/0203809 A1 * | 9/2005 | Stone et al. | 705/27 |
| 2006/0095281 A1 * | 5/2006 | Chickering et al. | 705/1 |
| 2006/0143068 A1 * | 6/2006 | Calabria | 705/10 |
| 2006/0200435 A1 | 9/2006 | Flinn et al. | |
| 2006/0212355 A1 * | 9/2006 | Teague et al. | 705/14 |
| 2006/0282328 A1 | 12/2006 | Gerace et al. | |
| 2006/0287916 A1 | 12/2006 | Starr et al. | |
| 2007/0043583 A1 | 2/2007 | Davuleu et al. | |
| 2007/0078898 A1 | 4/2007 | Hayashi et al. | |
| 2008/0077461 A1 | 3/2008 | Glick | |
| 2008/0109491 A1 | 5/2008 | Gupta | |
| 2008/0133657 A1 | 6/2008 | Pennington | |
| 2008/0162260 A1 | 7/2008 | Rohan et al. | |
| 2010/0030638 A1 | 2/2010 | Davis et al. | |
| 2014/0156401 A1 * | 6/2014 | Carr | G06Q 30/02 705/14.53 |

FOREIGN PATENT DOCUMENTS

| | | |
|---|---|---|
| GB | 2390925 | 1/2004 |
| WO | WO 95/23371 | 8/1995 |
| WO | WO 01/80039 A2 | 10/2001 |
| WO | WO 03/038563 A2 | 5/2003 |
| WO | WO 2004/036476 A1 | 4/2004 |
| WO | WO 2006/135920 A2 | 12/2006 |

OTHER PUBLICATIONS

XP002441767 [online] Retrieved from the Internet URL: http://www.archive.org/web/20051001143 606/http://www.youtube.com [retrieved on Oct. 1, 2005].

Notification Concerning Transmittal of International Preliminary Report on Patentability (Chapter 1 of the Patent Cooperation Treaty), for PCT/US2006/023088 dated Mar. 19, 2009.

Extended European Search Report, Application No. 06784855.6, dated May 4, 2010.

Egan, R., "The Secrets of Real-Time Search Success," *iMedia Connection* [online], Feb. 9, 2010, [retrieved on Feb. 10, 2010]. Retrieved from the Internet URL: http://www.imediaconnection.com/printpage/printpage.aspx?id=25877.

Office Action, Application No. CA 2,611,974; "Computer Method And Apparatus For Targeting Advertising", dated Feb. 18, 2015.

Reardon, M., Search social, "Computer Shopper" 24.4: 20(1). SX 2 Media Labs LLC, (Apr. 2004).

Salz, Peggy Anne, "Recommendations and Revelations", EContent 31.1.1:21, Information Today, Inc. (Jan./Feb. 2008).

Gundecha, P., et al., "Mining Social Media: A Brief Introduction", *Tutorials in Operation Research*, INFORMS 2012, pp. 1-17.

* cited by examiner

| Home Feedback Help Sign Out | Browse | Publish | Connect | My Content | My Network | My Info |

Tags ⊙ Suggested ○ Most Viewed ○ Most Discussed ○ Most Published
gather.com/...arts, books, business, education, environment, family, food 🔍 [ Search Articles ]  →   About search Edit Your Group Settings
Manage and edit your group details, settings, and permission any time you wish. Update the necessary information below. The only information that cannot be updated is group username.

Group Setting, Part I  ⟵ 112

Group Name [ Car Guys ]

*Group Username carguys.gather.com. Group username cannot be changed.

City [ Detroit ]  State [ MI ⇕ ]

Tags [ speed, suv, cars, porsche, truck, wheels, automobile ]

*Synopsis [ Where car guys go to talk about cars. ]

Description [ A forum to share your knowledge and expertise of cars with others. Share stories about trips and what your dreams are and why. ]

Group icon  ( Choose File )  no file selected

Group Setting, Part II  ⟵ 114

This group can be seen by ⊙ Everyone ○ Group Members Only
This group's content can be viewed by ⊙ Everyone ○ Group Members Only
This group's content is moderated ○ Yes  ⊙ No
People who want to join this group will ⊙ Be automatically added as members
　　　　　　　　　　　　　　　　　　○ Be reviewed by a moderator before acceptance
　　⟵ 116　　　　　　　　　　　　　○ Need to be invited by a member Default Member Permissions (by detail the group owner can do all of these things)
　☑ Can post to the group
　☑ Can publish using the group name
　☐ Can moderate content
　☐ Can moderate members
　☑ Can invite others
　☐ Can message the entire group Adult Group Setting
If your group involves subject matter that can be described as adult content, No Capitals, Spaces, symbols, or underscore. Up to 16 numbers or lowercase letters. The name you choose for your group will become your group homepage URL: namepace.gather.com.

Separate words and phrases with commas. Tags function as keywords that allow your group to be found by someone performing a search.

255 character maximum. This short description will display when someone searches for your group.

6000 character maximum. This longer description will appear on your group's About page.

JPG only. Browse your computer to upload an icon that represents your group.

Set permissions for viewing and joining.

Set permissions for publishing, content, invitations, member moderation, and messaging.

--- on their Gather pages.
　☐ Nudity

---

☐ Other

*= required field    [ SUBMIT ]

| View▼ | Publish▼ | Connect▼ 18 New | Communicate▼ 3 Messages | My Content▼ | My Profile▼ | My Points▼ 05 375 |

Welcome, Tommy! Account Settings | Logout

Search [Gather ▼] for [Blogging] [Go]        April 21, 2005

| ⊟ Browse Categories | Breaking News                                75 — |
|---|---|
| ⊞ News | This is the Breaking News Article and Corresponding Photo |
| ⊞ Politics | April 21, 2005 7:02a ET; By Username; |
| ⊞ Art & Culture | Rank: Quality 8.5 Popularity 9 |
| ⊞ Literature | Keywords: lacinia, metus, luctus |
| ⊞ Business | Category: Travel/Domestic/City Stays |

⊞ Human Interest
⊞ Spirituality         Realated Articles:         67
⊞ Food & Drink     This is the Name of Related Article One         Young boy looting, Port-au-Prince
⊞ Health & Fitness  This is the Name of Related Article Number Two   Haiti, 27 February
⊞ Sports               Top Stories [edit]                  Sponsored Links
⊞ Games                     Sort By [Date & Time ▼]     More Than a Blog   [more]
⊟ Travel                                                  A revolutionary new way to
  ⊟ Domestic         This is the Name of Article One     publish your stuff on the web.
    - City Stays     April 21, 2005 7:02a ET; By Username; www.squarespace.com
    - Close to Home  Rank: Quality 8.5 Popularity 9       Blogs for Young People [more]
  ⊞ International    Keywords: lacinia, metus, luctus    Get a free blog and share your
  ⊞ Theme            Category: Travel/Domestic/City Stays adventures and life with the world!
  ⊞ Adventure        Lorem ipsum dolor sit amet,          www.tigblog.org
  ⊞ Cruising ⊟ My Connections'                                        Learn How to Make Money
  Reading — 55     ▽ My Content              [edit]      With a Blog in This Crash Course.
>> Tom Churchill:                                        SuccessBlog.biz
  No-lag roll overs ▽ Topics | Find Interesting [edit]

More              ▽ People Who Interest Me  [edit]   Blogging                [more]
                     Tommy Churchill. Online Now     Powerful and easy to use.
⊞ Subscriptions—71   About Tommy | Email | Chat      Includes 1 GB of space, domain,
⊞ Bookmarks          View Tommy's Content            & email.
⊞ Recently Read                                       www.blogidentity.com
⊞ Local              Tommy's most recent writing
                     * No-lag rollovers with graphical/  Ads I've Seen Recently >>
                     CSS hybrid button                   Your Ads Here >>
                     *Moving forward table-free forms 76 ↘ ▷ My Connections' Writing    [edit]
        73 ↘ ▷ Groups I'm Part Of          [edit]

FIG. 3

Home Feedback Help Sign In | Browse | Publish | Connect | My Content | My Network gather.com/... arts, books, business, education, environment, family, food, health, money, movies music, news, people, politics, public radio, reviews, spirituality, sports, technology, travel 🔍 Search Articles    → about search

Enter Your Registration Information    ╱―132

▨▨▨▨▨▨▨
1. Register   2. Create Ad   3. Target Audience   4. Customer Profile   5. Establish Budget   6. Billing + Company Name  [B10 Used Bike Parts]          Reasons to Advertise on G

+ First Name  [Jeremy]

+ Last Name  [Potter]

Email  jeremy@gatherinc.com

+ Advertising Email  [jeremy@gatherinc.com]

+ Confirm Email  [jeremy@gatherinc.com]

+ Phone Number  [6177204000] ext: [1009]

Alternate Phone Number  [           ] ext: [   ]

Fax Number  [           ]

+ Address Line 1  [85 Devonshire St, FL3]

Address Line 2  [           ]

+ City  [Boston]

+ State  [MA]

+ ZIP  [02109]

+ = required field

Advertiser Agreement    view printable version

FIG. 6A

Home Feedback Help Sign In | Browse | Publish | Connect | My Content | My Network gather.com/... arts, books, business, education, environment, family, food, health, money, movies, music, news, people, politics, public radio, reviews, spirituality, sports, technology, travel 🔍 Search Articles        ➔ about search

Create Your Advertisement                        ╱—134

| 1. Register | 2. Create Ad | 3. Target Audience | 4. Customer Profile | 5. Establish Budget | 6. Billing |

+ Campaign Name        | Campaign 1 |

+ Advertisement Name   | Ad 1 |

Ad Preview
b
g
r
www.b10bikes.com

Your words will replace the example ad as you type.

+ Headline              | Bike Parts in Boston            | 34/35
+ Description Line 1    | Great selection of parts for both | 34/35
+ Description Line 2    | road and mountain! Save Money!  | 34/35
+ Display URL           | www.b10bikes.com                | 19/35
+ Destination URL       | http://www.b10bikes.com/home    | 996/1024

+ = required field  [BACK] [NEXT]

About Gather | Careers | Contact | Privacy | User Terms of Service | Advertise on Gather
Build 456; Lautrec2 Copyright © 2005-2006 Gather Inc. All rights reserved.

FIG. 6B

Home Feedback Help Sign In

| Browse | Publish | Connect | My Content | My Network | gather.com/... arts, books, business, education, environment, family, food, health, money, movies music, news, people, politics, public radio, reviews, spirituality, sports, technology, travel 🔍 Search Articles    → about search

Create a Customer Profile (optional)   ⟋138

1. Register   2. Create Ad   3. Target Audience   4. Customer Profile   5. Establish Budget   6. Billing Campaign Name Campaign 1
edit Advrtisement Name
edit Ad 1

Ad Preview Bike Parts in Boston
edit Great selection of parts for both road and mountain! Save Money!
www.b10bikes.com

How Do Customer Profiles Work?

As you create a Customer Profile, you can allow the advertisement to be displayed only to those who have relevant information in their member profiles. Associating a Customer Profile to your ads also means that other registered members will see your advertisement. While this limits the reach of your ad, it will also give you higher click-through rate (CTR) and a better return on your investment.

Your Keywords bikebikes, biking, cycling, spinning, mountain
edit bike, road bike.

+ Customer Profile Name [Profile 1]

Gender  ⦿ Everyone on Gather
   ○ Only registered Gather members who are:
   ☐ Male  ☐ Female Age Group  ○ Everyone on Gather
   ⦿ Only registered Gather members who are:
   ☑18-24  ☑25-34  ☑35-44  ☐45-54  ☐55-64  ☐65+

Household Income  ○ Everyone on Gather
   ⦿ Only registered Gather members whose incom is:
   ☑$0-$15,000  ☑$15,001-$25,000  ☑$25,001-$35,000  ☑$35,001-$50,000
   ☐$50,001-$75,000  ☐$75,001-$100,000  ☐$100,000+

Relationship Status  ⦿ Everyone on Gather
   ○ Only registered Gather members who are:
   ☐Single  ☐In a relationship  ☐Domestic parthner
   ☐Married  ☐Divorced Sexual Orientation  ⦿ Everyone on Gather
   ○ Only registered Gather members who are:
   ☐Straight  ☐Bisexual  ☐Gay/Lesbian  ☐Not sure Public Radio Listener  ⦿ Everyone on Gather
   ○ Only registered Gather members who :

U.S. State Residency
☐ Listen to Public Radio    ☐ Do not listen to Public Radio ○ Everyone on Gather
● Only registered Gather members who live in:

| | | | |
|---|---|---|---|
| ☐ Alabama | ☐ Illinois | ☐ Montana | ☐ Rhode Island |
| ☐ Alaska | ☐ Indiana | ☐ Nebraska | ☐ South Carolina |
| ☐ Arizona | ☐ Iowa | ☐ Nevada | ☐ South Dakota |
| ☐ Arkansas | ☐ Kansas | ☐ New Hampshire | ☐ Tennessee |
| ☐ California | ☐ Kentucky | ☐ New Jersey | ☐ Texas |
| ☐ Colorado | ☐ Louisiana | ☐ New Mexico | ☐ Utah |
| ☐ Connecticut | ☐ Maine | ☐ New York | ☐ Virginia |
| ☐ Delaware | ☐ Maryland | ☐ North Carolina | ☐ Vermont |
| ☐ District of Columbia | ☑ Massachusetts | ☐ North Dakota | ☐ Washington |
| ☐ Florida | ☐ Michigan | ☐ Ohio | ☐ West Virginia |
| ☐ Georgia | ☐ Minnesota | ☐ Oklahoma | ☐ Wisconsin |
| ☐ Hawaii | ☐ Mississippi | ☐ Oregon | ☐ Wyoming |
| ☐ Idaho | ☐ Missouri | ☐ Pennsylvania | |

+ = required field

NOTE: This profile will be assosiated with this ad. You can change the assosiation later in your ad tools.

[BACK] [NEXT]

About Gather | Careers | Contact | Privacy | User Terms of Service | Advertise on Gather
Build 456; Lautrec2 Copyright © 2005-2006 Gather Inc. All rights reserved.

FIG. 6D-2

Home Feedback Help Sign In | Browse | Publish | Connect | My Content | My Network gather.com/... arts, books, business, education, environment, family, food, health, money, movies, music, news, people, politics, public radio, reviews, spirituality, sports, technology, travel 🔎 Search Articles | → about search

Enter Your Billing Information ／—146

| 1. Register | 2. Create Ad | 3. Target Audience | 4. Customer Profile | 5. Establish Budget | 6. Billing |

☐ My name and billing info is the same as my registration info.

Credit Card Information

+ Card First Name [            ]
+ Card Last Name [            ]
+ Card Type [VISA]
+ Card Number [            ]
+ Verification Number [    ] What's this?
+ Expiration Date [January] [    ]

Billing Address

Info must match Credit Card Account

+ Address Line 1 [            ]
Address Line 2 [            ]
+ City [            ]
+ State [    ]
+ Zip Code [            ]
Promotion Code [            ]

+ = required field

[BACK] [NEXT]

About Gather | Careers | Contact | Privacy | User Terms of Service | Advertise on Gather
Build 456; Lautrec2 Copyright © 2005-2006 Gather Inc. All rights reserved.

FIG. 6F

Home Feedback Help Sign Out | Browse | Publish | Connect | My Content | My Network | gather.com/... arts, books, business, education, environment, family, food, health, money, movies music, news, people, politics, public radio, reviews, spirituality, sports, technology, travel 🔍 Search Articles            ➔ about search View Reports  Campaign Manager  Create Ads  Customer Profiles  My Advertisements  Account Info

View Reports

Select type of report you wish to view via the pull-down menu. By default, data is displayed from the end of the last billing period to today, but you may modify the time period.

Select Report          Start Date      End Date
[Campaign Activity Summary]  [05/01/2006]       [05/23/2006]

(SUBMIT)

One item

| Campaign name | Impressions | Total clicks | Ctr | Total cost | Avg cpc |
|---|---|---|---|---|---|
| Campaign 1 | 0.0 | 0.0 | 0.0 | 0.0 | 0.0 |

Export options: CSV | Excel | XML

About Gather | Careers | Contact | Privacy | User Terms of Service | Advertise on Gather
Build 456; Lautrec2 Copyright © 2005-2006 Gather Inc. All rights reserved.

Home Feedback Help Sign Out

| Browse | Publish | Connect | My Content | My Network | gather.com/... arts, books, business, education, environment, family, food, health, money, movies, music, news, people, politics, public radio, reviews, spirituality, sports, technology, travel 🔍 Search Articles    → about search View Reports  Campaign Manager  Create Ads  Customer Profiles  My Advertisements  Account Info

Customer Profiles lets you select geographic and demographic criteria to finely tune your advertisements to your key customers. You may create many or as few Customer Profiles as you feel you need in order to balance your ads across our diverse community.

Customer Profiles can be associated with individual advertisements, a group of advertisements in a campaign, or across your entire account. When Customer Profiles are combined in different ways you have very powerful ad targeting control at your fingertips. You create Customer Profiles and create new ones whenever you like.

Click on a Customer Profile name to edit the criteria or Create a New Customer Profile.

Learn More about Customer Profiles

One item

| Customer Profile Name | Customer Profile Summary | |
|---|---|---|
| Profile 1 | 18-24, 35-44, 25-34, MA, $35,001-$50,000, $0-$15,000, $15,001-$25,000, $25,001-$35,000 | Delete |

↘154

About Gather | Careers | Contact | Privacy | User Terms of Service | Advertise on Gather
Build 456; Lautrec2 Copyright © 2005-2006 Gather, Inc. All rights reserved.

FIG. 6J

COMPUTER METHOD AND APPARATUS FOR TARGETING ADVERTISING

RELATED APPLICATIONS

This application claims the benefit of U.S. Provisional Application No. 60/690,005, filed Jun. 13, 2005 and U.S. Provisional Application No. 60/734,690, filed Nov. 8, 2005. This application is also a Continuation-in-Part of U.S. application Ser. No. 11/371,462, entitled "User-Driven Media System in a Computer Network" filed on Mar. 9, 2006. The entire teachings of the foregoing applications are incorporated herein by reference.

BACKGROUND OF THE INVENTION

A global computer network (e.g., the Internet) provides a marketplace for advertisers based on keywords. More specifically, an end user commonly uses a search engine to browse for content on the global computer network or browses content including articles and emails that contain keywords or keyword sets. Typically the search engine operates on keywords entered by the end user as search terms or encountered in content viewed by the user. In cooperation, an ad engine provides, from a depository of advertisements, ads targeted for the same keywords as those used by the search engine on the content in response to the end user's search query. The provided corresponding targeted ads of the ad engine are displayed to the end user along with the search results (content) of the search engine. Ads are displayed in many forms including lists of textual ads, banners, pop up windows and sponsor or other columns.

Thus ad delivery services, ad engines and depositories typically charge per search term or keyword that a subject ad is targeted for. For example, the advertisement rate may be
  83¢ for a given ad to be selected and displayed in a top (first) grouping based on the search term "Vegas";
  $2.00 for the given ad to be similarly selected and displayed based on the search term "hotels" and
  $4.50 for the given ad to be selected and displayed based on the search term "Vegas hotels".
These rates are often set by a persistent auction, allowing advertisers to bid for placement adjacent a keyword or keyword set against other advertisers seeking similar placement. This keyword bidding creates a marketplace around the keyword or keyword set, setting the price for this advertising dynamically for each keyword or keyword set. Further, the ad owner pays these rates (or the accumulation thereof) for an end user clicking on (selecting) the ad as displayed. Thus a "cost per click" accounting is common in the industry.

There are other cost structures for advertising on the Internet, for example cost per acquisition or cost per 1000 impressions ("views"). Generally the greater visibility (e.g. pop up ads, top of page banners, first item on a sponsor list displayed next to search results, etc.) the higher the price for the ad.

SUMMARY OF THE INVENTION

The present invention is not focused on keywords appearing on a Web page as in the prior art. Instead embodiments of the present invention create a respective user profile for each end-user. The respective profile includes key words and key phrases encountered by that user. The invention differentiates between key words/phrases read by the end-user and key words/phrases written by the end-user. The system records the recency and/or frequency of a key word/phrase being read or written by the end-user. In one embodiment, the system removes certain terms from an end-user's profile if the recency or frequency of a key word/phrase being read or written by the end-user falls below a certain threshold.

In some embodiments, the system creates a profile of an end-user looking at the content of Web pages being browsed by the end-user and the content that the end-user publishes. The system records the categories and/or classification tags of the browsed/published content differentiating between content that is read by the end-user, written/published by the end-user and recency/frequency thereof. The system expires some categories based on recency and/or frequency of end-user reading or writing content in the category/class. The system also differentiates between classification tags created by this user versus tags created by the community.

In a preferred embodiment, the system adds to the end-user's respective profile the user-provided demographic information. When not provided by the user, the system may forecast demographic information for a user based on relationships with other users and/or group membership (e.g. Zipcode is forecast as the average or most common Zipcode of friends, average age of friends is assumed to be the end-user's age, dominant gender of friends is assumed to be gender of the end-user, and so on). The system further forecasts demographic information based on system usage (e.g., end-user checking of weather or reading of content for Boston indicates end-user's region, or consuming content for parents indicates the end-user has children). Preferably the system differentiates between user expressed demographic characteristics and forecasted characteristics in the profile.

In another feature of the present invention, the system creates a behavioral profile of a subject end-user. The behavioral profile includes indications of frequency of different activities (checking weather, checking stock quotes, sending email, using instant messenger, moving from location to location or PC to PC) through observed behavior. The behavioral profile of the end-user may further include indications of the advertisements that the end-user has seen. The system may record indications of (i) whether the end-user has responded to those advertisements (clicked on or otherwise selected), whether the end-user made a purchase as a result of those advertisements (bought/subscribed), and (iii) the categories of products that the end-user responds to. The system records recency of these end-user activities/interactions with advertisements and frequency and/or recency of end-user response with regard to product, advertiser and/or category of advertisement.

Preferably the system combines keywords, key phrases, categories, tags, demographics, and the above behavioral characteristics into a single targeting profile of the end-user. In turn, advertisers target end-users based on their respective profiles defined above. In some embodiments, an advertiser selects one method/focus of targeting (e.g., content interest, category interest, and so on). In other embodiments, the advertiser selects multiple methods/focuses of targeting, e.g. the intersection of certain demographics (say males between 25 and 44) AND content interests (for example, city of Boston and real estate).

In turn, each time the advertiser selects targeting criteria, the system calculates or forecasts the number of end-users that fall within the prescribed target area. Further, based on advertiser selected targeting criteria, the system forecasts the advertising response (clicks/selections by end-users) and the purchasing (revenue or products) that will result from the campaign.

In some embodiments, the system displays an advertisement to an end-user no more than a set number of times each day.

The system enables advertisers to bid to reach a certain size audience indicated as an estimated number of click throughs and/or estimated sales. The advertiser enters a bid per end-user reached with their advertisements. This is a fee charged based on the number of times an end-user views the advertisement. The advertiser may enter a bid per view (or thousand views) and the system returns a likely number of impressions resulting and their average placement in the ad results. In one embodiment, the system-user interface employs a "slider" for the advertiser to enter his bid. The system may display a graph showing users viewing per day on one axis and cost per view on another axis.

In a preferred embodiment, advertisers bid to achieve a certain number of click-throughs within a specified time period based on their targeting criteria. The advertiser enters a bid per click (or thousand clicks) and the system returns indications of:

(i) a likely number of clicks resulting,
(ii) the estimated average placement in the ad results, and
(iii) the total the advertiser could spend at that bid.

In one embodiment, this is accomplished by the advertisers user using a "slider" in the graphical user interface. A graph illustrates number of users viewing/day on one axis and cost/view on another axis.

In another embodiment, advertisers can bid per view or bid per click. In turn, the system forecasts advertisement views or clicks based on the combined targeting, and prioritizes ads singular selection based on financial reward to the host (system) site.

Another embodiment provides advertisements targeting a user organized in a list for that user, regardless of how they are targeted to that user (by demographic, content interest, category being viewed, etc). The system selects which advertisements to show to a user based on the bid amount showing the advertisements with the highest bids first. The system projects the likelihood of the user clicking on the advertisement and then ranks the advertisements in order of said likelihood and displays them in ranked order. The system may rank each advertisement based on the bid amount for the ad multiplied by the likelihood of user selecting (clicking on) it and then displays the ads in ranked order.

In some embodiments, ad preference degrades as selection potential decreases.

In embodiments of the invention an ad selection engine disables further display of an advertisement for a specific user after it has been seen a set number of times or clicked on a set number of times by that user.

In another feature, the invention system provides reports to the advertisers reporting on the advertisements shown and clicked on (selected by viewer users). The system may report sales, subscriptions, registrations and the like to the advertiser. Advertisers may filter these reports by any of the advertising targeting characteristics to see varied responses. The advertisers may break-down reports by demographic category, keyword/phrase, category, or similar user or content categories and see totals across these categories.

The system may identify the most successful user categories. The system may identify the most successful keyword/phrase or content categories and may recommend them to the advertiser user. The advertiser may select these recommendations or a combination of them and automatically target a campaign with them or retarget a campaign with them.

In some embodiments the system enables users that see advertisements to rate the advertiser by selecting a numeric performance rating. This feature may be limited to only those users clicking on an advertisement, or to only users purchasing from the advertiser. In one embodiment, the system enables users to provide multiple performance ratings on different advertiser characteristics (e.g. price, shipping costs, customer service, etc). The system displays, advertiser ranking adjacent to advertisements to assist consumers in selecting the best advertiser for their purposes The system may add advertiser ranking to consumer user profiles, determining which characteristics of an advertiser matter to consumers (good price or good service). This information is then used to target future advertisements to a user.

Accordingly in some embodiments, advertisers receive reports on their different rankings as part of the advertising system. The reports may be broken-down by the demographic and content categories described above.

In accordance with another aspect of the present invention, the system enables advertisers to give points to users for purchasing, either in the form of points or cash-back. The system allows fixed reward amounts (e.g. 5000 points for a subscription to cell phone service) or scaled reward amounts (e.g. 1 point for every $1 spent) or combinations of these. The points are a common currency across all advertisers (like an online version of S&H Greenstamps). The points may be combined with points earned for other purposes such as described in U.S. patent application Ser. No. 11/371,462 herein incorporated by reference. In the system, advertisements from advertisers offering customers rewards for purchasing are called-out to viewer-users by any combination of visual cues and audio cues. The cues may differentiate the reward type (e.g. 1 point/$1 or fixed fee or similar).

The invention system may prioritize advertisement based on the likelihood of user response (as above) and the estimated response of a given user is increased because of the call-out. In turn, the selection engine moves an advertisement higher in the display priority or shows it more frequently. The system may prioritize advertisements based on the combination of estimated user response time, ad value to the company (also as above) and increase in particular user response due to the call-out. In turn, the effective cost of the advertisement is decreased. Where the user response goes higher, the advertiser does not need to bid as much to achieve the same advertising results.

In some embodiments, the system calculates the value of the points (total retail value or margin earned) to the company displaying the advertisement and includes that total in the calculation of the value of the ad when determining ad placement. For example: PlacementRank=(bid+PointsValue) for advertisements ranked and displayed just on bid value or PlacementRank=(bid+PointsValue)×ResponseLikelihoodProjection for ads ranked and displayed on economic value to the company. The preferred embodiment is the latter of these two.

In embodiment of the present invention, the advertisements are categorized by advertiser type, product type, region of availability, currency, language, keywords and other factors. The advertisements are displayed offering the consumer (viewer-user) the option (a link, e.g., "More Ads Like These" link) to other similar advertisements based on the categorizations deemed important for this advertisement. The link generates for the user a page or pages displaying similar advertisements. The initial advertisement may remain visible (simultaneously displayed). The user may directly respond to competitive advertisements, by clicking on or otherwise selecting them, for example. Likewise, the competitive advertisements each also offer the opportunity to see similar advertisements. In some embodiments, the system allows advertisers to bid additional money, or pay a flat fee to remove the "more" link to competitive ads.

In some embodiments, the system maintains an indication of the advertisements a viewer user has seen. The system identifies and records the advertisements that a user has responded to. The system provides to the viewer-user the option to see advertisements that he has previously viewed or previously responded to. The system displays to the user a list of advertisements that he has previously viewed with those he has previously responded to highlighted or otherwise called-out.

In some embodiments, the system not only enables a subject user to view advertisements that he has previously responded to but enables others to view those advertisements (or lists thereof) of the subject user. The system thus enables an advertiser to see, aggregated in a single place, all of the advertisements (or lists thereof) viewed recently by those viewers-users who have linked to the advertiser website. In some embodiments, the system displays the subject advertisement lists, but not the names of the people who have responded to the advertisements, especially when there is less than a threshold minimum number of such people. Then ensures protection of privacy. The system enables the advertiser-user to sort or filter the list of advertisements seen by a viewer-user or by a group of people by advertiser type, product type, recency or frequency of viewing, or advertiser ranking/rating (mentioned above). Embodiments enable a default sorting or filtering to be applied for an advertiser-user prior to his viewing the list.

In some embodiments, the system enables the individual viewer-user to determine whether others (advertisers) can see indications of the advertisements that he has viewed.

Further, in some embodiments, advertisements of a certain type (adult matter, alcohol, etc) are not shown in a user's viewed advertisements list.

In accordance with one aspect of the present invention, presented is an online advertising system with an integrated direct marketing system to attract new advertisers. The invention system allows a company to offer an advertising credit to a prospect advertiser-user. The credit may be recorded in the advertiser-user's account prior to the advertiser being contacted. The system allows a list of advertiser-users to be added to the system, including contact information and advertising credit. The system generates emails that allow the advertiser-user to link directly back to the advertising system and create an account. The account may have the credit balance in it when created. The system may require the prospect to set-up billing for future advertisements (once the credit is used) prior to the credit becoming available.

Alternatively or additionally traditional direct mail with a unique code on it for the advertiser may be employed instead of or similar to the email system described above. The email and direct mail pieces contain respective codes that link to a single account allowing the sending of different types of marketing materials to the same person, but preventing the creation of duplicate accounts with duplicate credits. The system searches for existing advertisers based on contact information, email address and company name and alerts the user to the fact that a prospect may already be a registered system user or prevents the sending of those messages.

The system may report on the total credits issued, the total credits used and percentage of credits used where the credits expire on some schedule. Further the system may report on the success of each mailing. For example the system shows what percentage of advertisers that use their credits then proceed to spend more advertising revenue with the company. The system may report the total advertising revenue received in a period as well as the total credits issued or spent in that period. The reporting system further filters the reports based on the primary targeting used for the credits or based on the category of advertisers using the credits.

In other embodiments, the invention system splits or otherwise shares advertising revenue with the advertiser-users for their content (authored works). The share in revenue is in the form of a credit used to buy advertising space. Where an advertiser uses this credit to buy advertising space adjacent his authored works, the system compensates him for these ads ("credit-ads") as authored works (content contributions in a user driven media system). In some embodiments, compensation for credit ads is at a different rate than if cash had been used to place the ad.

More generally, in some embodiments the individual or company placing an advertisement receives compensation for the ad placement in the form of points or cash-back. To that end, the system records advertising placed with a media company or across several sites with a placement service. The system records the total amount spent on that advertisement. The system contains a ratio of points or cash back given for every advertiser dollar spent, and the system calculates the amount earned by the person placing an advertisement periodically. The system stores indications of the calculated amount (such as in a database) and enables reporting of the same to the advertiser user. Further the system may record a total spent from multiple advertising campaigns for an advertiser-user, and the system may allow the aggregate balance to be used to purchase items or to be converted to cash and transferred from the system to a different financial account.

The advertiser-user may decline points if his company does not allow him to receive incentives or gifts for work-related activities. In other embodiments, the invention system is connected to a central points/compensation system that allows rewards for other activities.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2e-2g are block and schematic diagrams of group interface pages in the system of FIGS. 2a-2d.

FIG. 3 is an illustration of the reader-user interface, including a list of content prioritized based on the reader's expressed interests, the relationships that reader has with various writers and the recency and quality of the materials being presented.

FIGS. 6a-6k are schematic views of the advertiser-user interface in one embodiment of the present invention.

DETAILED DESCRIPTION OF THE INVENTION

A description of preferred embodiments of the invention follows.

The present invention starts from a user-driven media system 100 such as that described and disclosed in related U.S. patent application Ser. No. 11/371,462 (incorporated herein by reference). That system is summarized below in FIGS. 1-3.

Briefly, a web site or host server 60 provides the user-driven media system 100 to reader-users, writer-users and members of a group. An end-user can be any combination of a reader-user, writer-user and member of one or more groups. The system 100 enables writer-users who frequently produce authored works 29 to be compensated (i.e., a frequent writer compensation program). Authored works 29 include any combination of text, photos/images, audio, multimedia and the like. The system 100 enables reader-users to rate authors and/or authored works 29, to comment on the same, to create a list of works 29 and/or comments to visit again or suggest to others (i.e. "bookmarks"), to tip (pay gratuity to) authors and categorize or tag (or recategorize/retag) authored works 29. End-users communicate to each other and among groups in system 100 using user-defined relations or connections (e.g., friends, colleagues, private group, etc.). Communications center around the various content (authored works 29, comments, bookmarks, tags) made available and maintained on the system 100. In system 100, bookmarks may have properties of user-defined ratings, comments, tags, title/body, author, publication status, URL, Date/time of creation and date/time of use.

Figure 4:
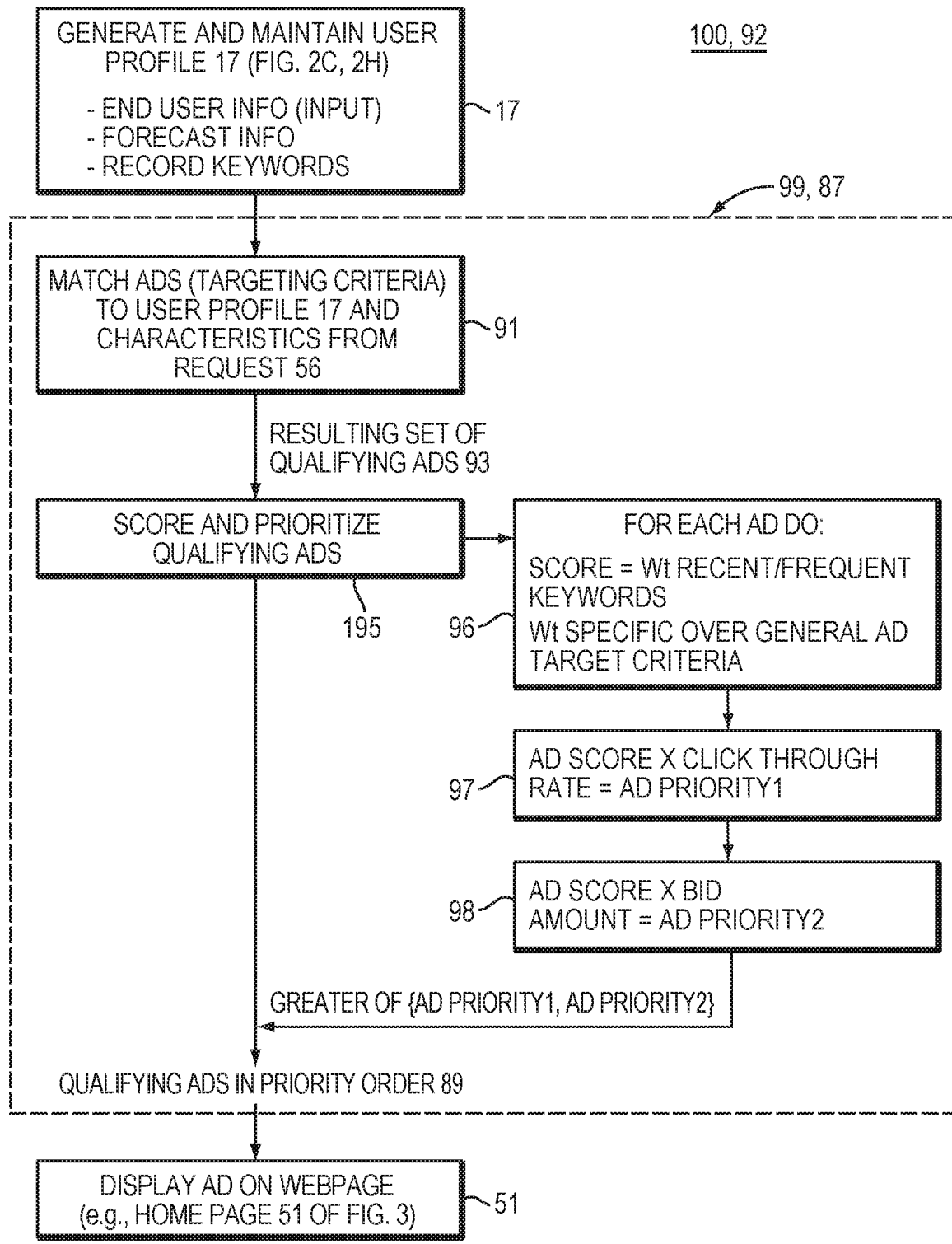
FIGS. 4 and 5 are block diagrams of an ad subsystem (member) in the system of FIGS. 2a-2h and embodying the present invention.

Given the foregoing, the present invention adds a targeted advertising component/dimension to system 100. The present invention forms and maintains user profiles 17 (FIG. 2h) based on information received from end-users and information deduced by end-user activity as users of system 100. The present invention employs the user profiles 17 in targeting ad campaigns. Advertisers bid on the invention suggested ad targets and invention predicted/projected end-user effect (selection or click through or purchase). This and further features will be made clear by the following description of embodiments of the present invention system 100 with targeted advertising component 99 (FIG. 4).

Figure 1A:
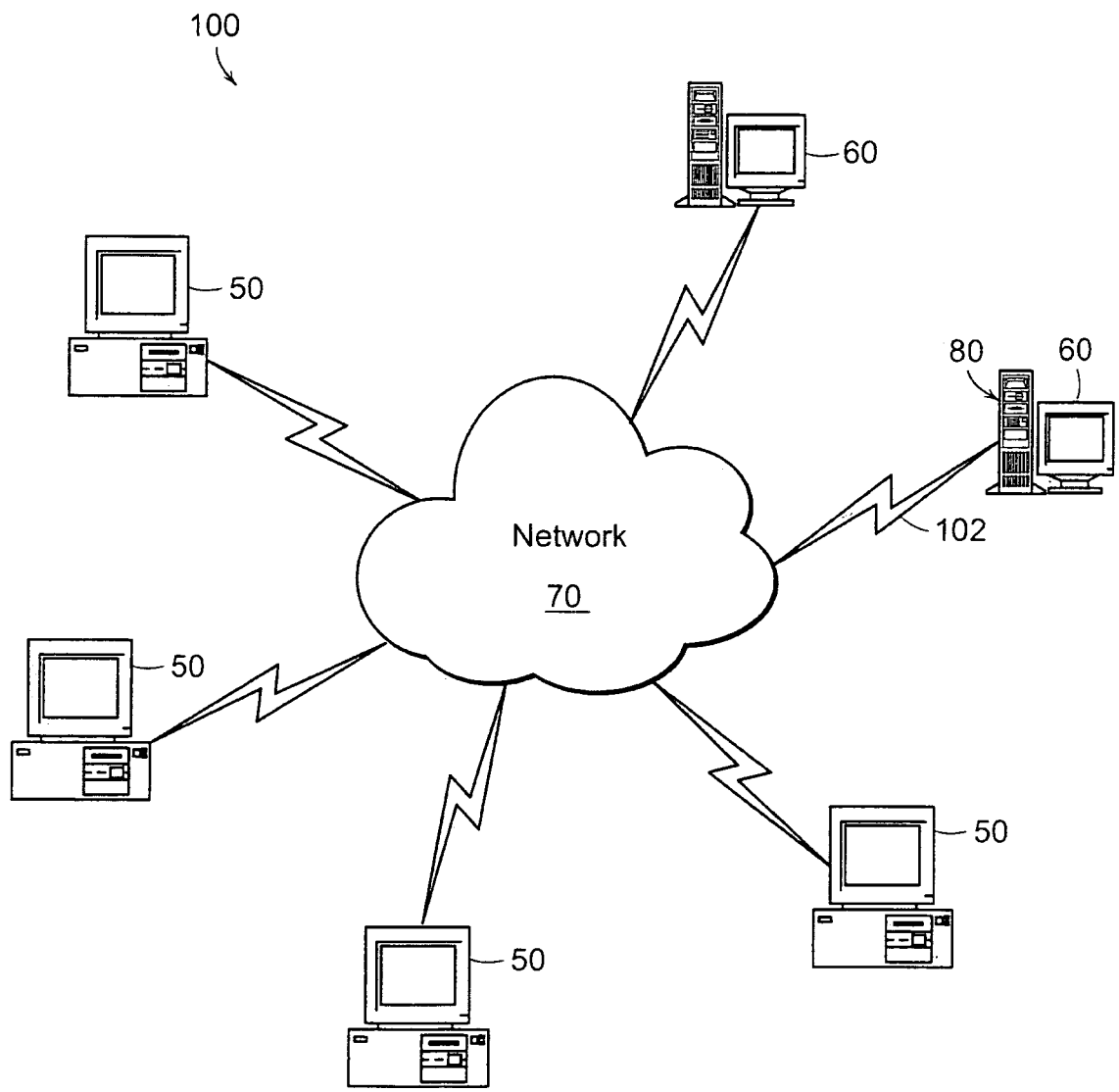
FIG. 1a is a schematic diagram of a global computer network environment in which embodiments of the present invention operate.

Illustrated in FIG. 1a is a global computer network environment in which embodiments 100 of the present invention are implemented. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. Other global computer networks 70 are suitable.

Figure 1B:
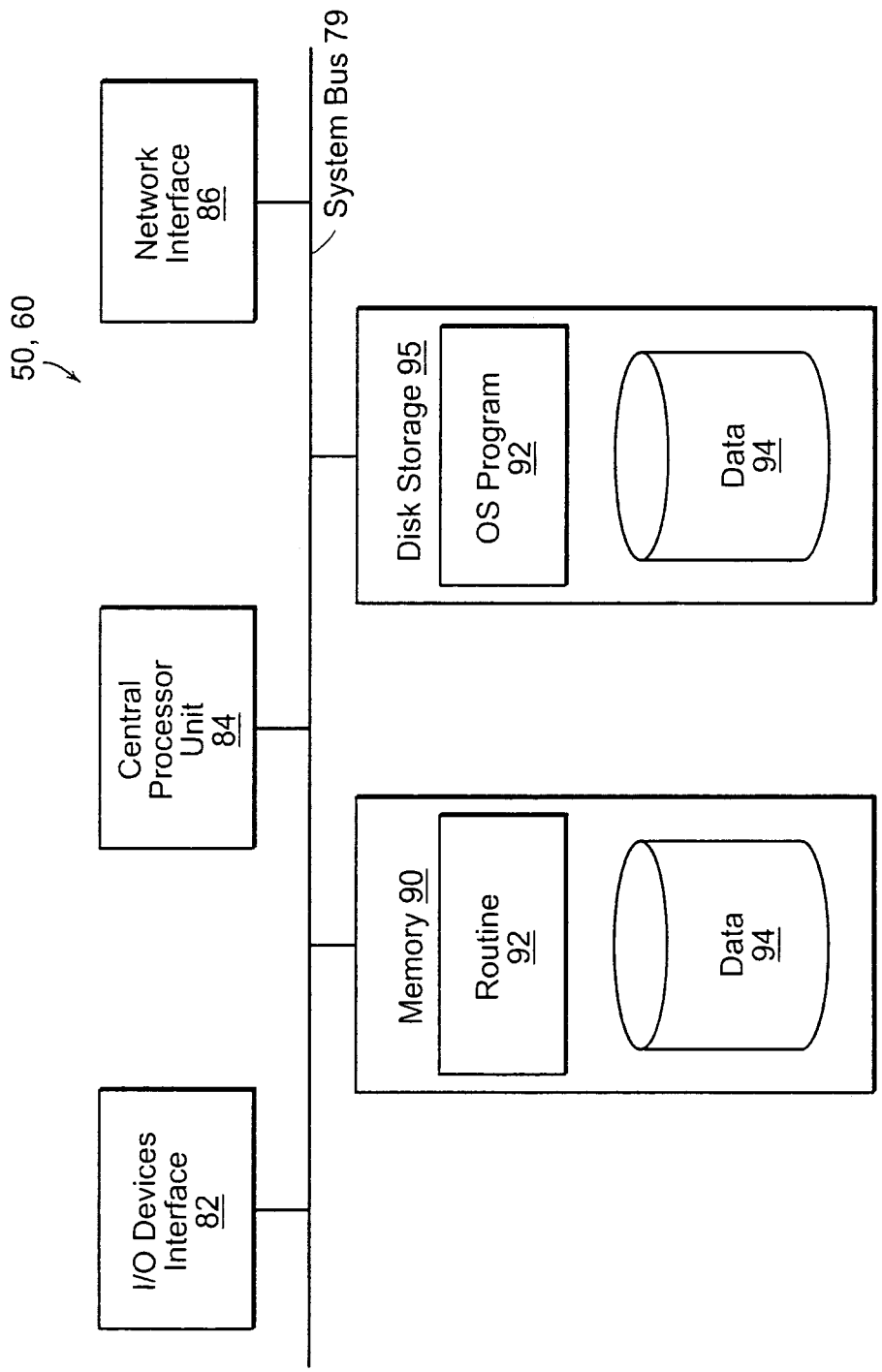
FIG. 1b is a block diagram of the different components of a computer node in the network of FIG. 1a embodying the present invention.

FIG. 1b is a diagram of the internal structure of a computer 50, 60 in the network of FIG. 1a that implements the present invention system 100. The computer 50, 60 contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 1a). Memory 90 provides volatile storage for computer software instructions used to implement an embodiment of the present invention (e.g., Program Routines 92 and Data 94). Disk storage 95 provides non-volatile storage for computer software instructions and data used to implement an embodiment of the present invention. Central processor unit 84 is also attached to system bus 79 and provides for the execution of computer instructions.

In one embodiment, computer program product 80, including a computer readable medium (e.g., a removable storage medium such as one or more DVD-ROM's, CD-ROM's, diskettes, tapes, etc.) provides at least a portion of the present invention software instructions. Computer program product 80 can be installed by any suitable software installation procedure, as is well known in the art. In another embodiment, at least a portion of the software instructions may also be downloaded over a wireless connection. Computer program propagated signal product 102 embodied on a propagated signal on a propagation medium (e.g., a radio wave, an infrared wave, a laser wave, a sound wave, or an electrical wave propagated over a global network such as the Internet, or other networks) provides at least a portion of the present invention software instructions.

In alternate embodiments, the propagated signal 102 is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network. In another embodiment, the computer readable medium of computer program product 80 is a propagation medium that the computer system 100 may receive and read, such as by receiving the propagation medium and identifying a propagated signal embodied in the propagation medium, as described above for computer program propagated signal product 102.

Figure 5:
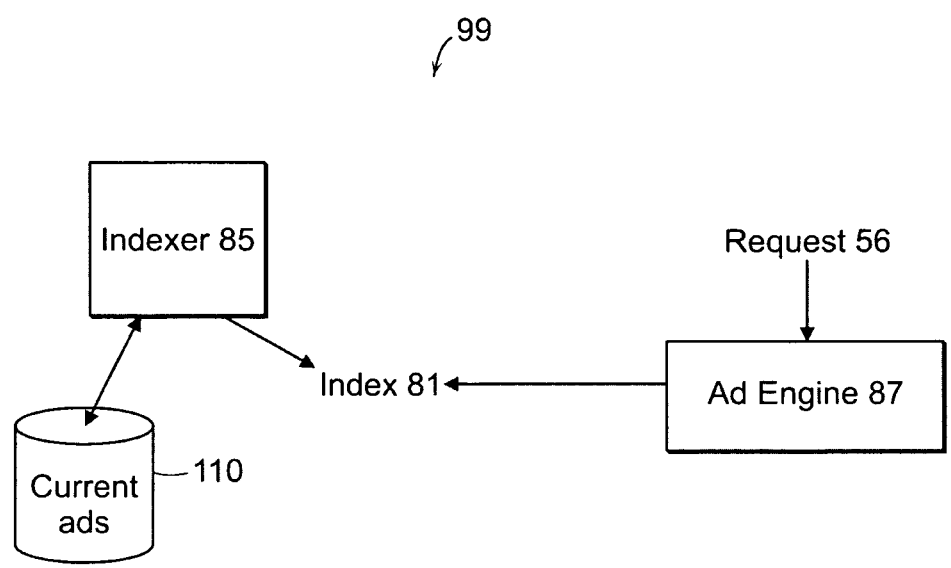

In one embodiment, software instructions 92 executed on server computer 60 (the Web host machine) includes code for (1) supporting a contributor (frequent writer) compensation Web site in which content is accessed through searching, sorting and classifying content/authored works 29 (comments, bookmarks, etc.) by author and/or keyword tags, (2) forming user groups and connections and using relationships to organize content and browse the system 100 for content, and (3) targeting advertisements based on end-user profiles formed by end-user activity on the Web site 60 (system 100). In the embodiment of FIGS. 4 and 5 (detailed later), software instructions 92 include ad system 99, ad engine 87 and corresponding bid management instructions as will be made clear later.

FIGS. 2a-2h provide an illustration of the computer software code 92 executed on a server computer 60. Server 60 code provides a Home Page 21 of the invention system 100. At the Home Page 21, the operations of General Information/Help 23, Search 25, View 27, Publish 11, Connect 31, Communicate 33, My Content 35, My Profile 37 and various accounting 39, 41 are provided.

Through registration process 45 a, b (FIGS. 2b and 2d), a user (an individual, a company or other entity) becomes a member to the invention Website/company (or registered user of the invention system 100). In one embodiment, during registration 45, users enter profile and other information, including a user name, email address and login confirmation. My Profile 37 is a set of aspects and settings that results from such user input in registration process 45. In one embodiment, My Profile 37 includes (i) general information, (ii) demographic information, (iii) school/college information, (iv) indications of hobbies, entertainment and TV/media likes/interests, (v) personal biographical data, (vi) political affiliation, (vii) other affiliations, (viii) companies and (ix) photos, for example. Other categories of information are suitable. Each category of information is stored in one or more profile entry tables or the like as illustrated at 38 in FIG. 2c. Advertiser users (business affiliates) use a different process 47 (FIG. 2b) to register with the invention system 100 as further detailed later in FIGS. 6a-6k.

Example data sets supporting the user registration process 45 and My Profile 37 in a preferred embodiment are as follows. Database tables for storing and relating user data (e.g., My Profile 37, etc.) and other system data are illustrated in FIG. 2h and discussed later.

About Me

The system 100 provides members the ability to publish information about themselves. There are two types of profile information: basic and extended. The basic profile is preferably always public to every one where the extended one can be customized. The member can however specify if his basic profile should be shown to non-members (default is to show in one embodiment).

The extended profile of a member-user is divided into blocks of information. The user may set the audience who can see each or respective blocks of information.

The user is able to enter extra or additional information that is not already an offered standard area of information of system 100.

Connection Management 31

Members are able to build a social network of friends, family members and coworker. In one embodiment, connection management 31 follows the operations and parameters outlined in Table 1.

TABLE 1

Connection Management

| Feature | Description |
| --- | --- |
| Three connection classes | One embodiment of the system 100 provides three connection classes:<br>Friend connection<br>Family connection<br>Work (colleague) connection |
| Connection classes distinct | Friends can only see other friend connections (similarly for work/colleague and family connections). |
| Connections are reflexive | If person B is person A's connection then person A is person B's connection too. If person B is NOT person A's connection, then person A is not person B's connection either. |
| Connection invitation | Establishment of a connection between two members is made by one user sending a connection invitation to another member (or non member). |
| Connection acknowledgement | New connection must be acknowledged by both parties tied in the connection. When acknowledging, the member has the option to "also subscribe to this member . . . ". |
| Invite non members | A member is able to send an invitation to a non member without implying a connection between the two. If the invitation was sent to a non-system member (invitee), the invitee is able to join system 100 or a group that the inviting member has invitation priviledges to (invitor). Note that requirement "connection acknowledgement" must be satisfied. |
| View "who's online" | The member is able to know who among his connections is currently online. User can control his presence knowledge per friend class. |
| Show prior invitations after registration | Let's say that a person has 2 email addresses, one which he rarely checks. Let's also assume that 5 different members sent him registration invitations to his "less watched" address and 1 to the one he monitors more. After the registration process 45 (where he input his 2 email addresses), the system 100 automatically creates 6 connections with other members. |
| Deleted connections | A user can delete a connection at any time |

External Contact

The system 100 provides the user the ability to enter contact information of people that are not system members. In one embodiment, operations and parameters supporting this ability (functionality) are outlined in Table 2.

TABLE 2

External Contact

| Feature | Description |
|---|---|
| External contact are private | A member's external contact information is held private. No one but the member can see this information |
| Easily send invitation to external contact | A member must be able to easily send an invitation to an external contact. |
| Ability to import/export/sync | A member is able to import/export/sync his contact list. This feature mimics PLAXO ™ or similar. |
| Support mailing lists | The member can create mailing lists. The number of email addresses in the mailing list has a limit which is customizable in system 100 (set by the system administrator). |

When a member sees another member's profile information, the system 100 (connect module 31) shows him if he is connected to that member and how he is connected to this member by showing the shortest connection path from him to the other member optionally and for each connection class. The system 100 preferably shows multiple paths of network relation, up to three levels or degrees of separation. Me>User 1>User 2>You. A subject user sees his closest connection. Beyond three levels, the system 100 indicates that the subject user is not closely connected in one embodiment. The number of people connected between a given user and a subject target person (including the target person) is termed the 'degrees of separation' with respect to the user. System to Confirm Email Addresses (FIG. 2d)

In some embodiments, the system 100 makes a distinction between confirmed email addresses and unconfirmed ones. Operations supporting this are outlined in Table 3.

TABLE 3

Confirm Email Addresses

| Feature | Description |
|---|---|
| Login with any confirmed email. | Any confirmed email addresses can be used to login to the system site 60 |
| Lookup unconfirmed email | Confirmed email addresses can only be used to lookup a member. The system 100 warns a user when attempting to use it (such as trying to send an email to an unconfirmed email address) |
| Steal unconfirmed emails | If user A has an unconfirmed email address of a@a.com and users B confirms the email a@a.com, then the system 100 removes this email from A's list of unconfirmed email addresses. |
| Unconfirmed emails flagged | Any email that is unconfirmed is flagged as such. |

Groups

There are two types of groups: "personal groups" and "shared groups". A Personal group is a private list of other members and contacts. Techniques similar to address book groups in email systems are employed to support this feature.

A shared group is a place holder where articles (authored works) 29 can be published and group members notified when a new publication occurs or when someone posts a comment on an article that is part of the group. Shared groups allow their members to have a common location where they can communicate (e.g., via messaging component 33) and membership of the group is generally viewable by all group members.

Turning briefly to FIG. 2g, to create a group, a user provides to system 100 (connect module 31, group function): his name, a description, group profile information 112, such as group URL name, group name, group icon and location of the group (city/state/country), group type 114 (auto-join of new group members, moderation of group members manually, invite only), default member permissions 116 (post, invite, moderate content, moderate members, send broadcast private message, post on behalf of group, feature content), common group "signature" for articles posted by group contributor and various viewable metadata such as create date, number of members, etc. Further, system 100 has the group creator indicate 114 who may view the group's content (e.g., group members only or the public).

Groups may be categorized or tagged within the group profile page by the owner. In addition, system 100 uses the tags of the top percentage of viewed articles (for example top 25%) for tagging the group.

User specific permissions (permission settings 114) may be set as a default for new group users when the group is created. Invites issued for the group inherit these permissions, but the member issuing the invite (if they themselves are authorized) may add additional privileges, such as inviting a new user to have moderation privileges. Those members with user administration privileges may modify user permissions at any given time.

Below is a table of what permissions may be assigned in one embodiment.

TABLE 4

Group Privileges

| Privilege | Who can be granted it (by group owner) | Default |
|---|---|---|
| Read Group articles | Public, Individual group members | Public |
| Post Group Articles | Individual group members | All Group Members |
| Delete Group Articles | Individual group members | Owner only |
| Invite Members to Group | Individual group members | Owner only |
| See Group's Name/Profile | Public, all group members | Public |
| See Group members | Public, All group members | Public, All Group Members |
| Moderate submitted articles | Individual group members | Owner only |
| Remove member | Individual group members | Owner Only |
| Send Broadcast private messages to the group | Individual group members | Owner |
| Post on behalf of group | Owner, Individual group members | Owner |
| Feature Content | Owner, Individual group members | Owner |
| Join group (w/o moderation/auto-join) | Public | Public |

Viewing of Group Content

Seeing content within groups is dependent on several factors. Essentially, it is the culmination of the viewing permissions set on the group, the content, and the author. FIGS. 2e-2f are illustrative.

Group content can be found in a group in a variety of ways. In one way, if the group is not visible, the group name does not show up in a global site search on any of its content, categories, or tags, or browsing by any of those criteria. The group name also does not appear on any user pages unless one is a user in that same hidden group.

Otherwise, groups are integrated with the search system 25 (both a search within a group as well as a global site search) and accessible through the user interface under the View 27 menu or something as appropriate. As shown in FIG. 2e, groups can be found by browsing for category 200, tag (keyword) 201, or a general group directory 203 by group name. Other embodiments of system 100 include a group keyword search 204 and various filtering group listings 205 for presenting to a user for selection of a group of interest. Groups may be searched by authored works 29 of the group, number of members, publishing rate and/or commenting rate on authored works 29 as well as other parameters/factors as supported by master table 120, publication table 124 and tagging table 126 (FIG. 2h).

FIG. 2f illustrates an example group homepage 210. Based on group creator input (at connect module 31 as previously described), group homepage 210 displays the creator given group name and icon, and other group information. The illustrated group homepage 210 displays group announcements, a listing of recent authored works 29 posted to the group, a listing of recently joined group members and a listing of the user's recent works 29 in this group. Navigation indicators (e.g., "By Tag," "By Category") are also displayed. This enables a user to have the system 100 display indications of (i) group members writing the most on a user-selected tag (keyword), (ii) other groups related to the subject tag (keyword) and (iii) authored works 29 of the group on that keyword. With the latter, system 100 can further display the group's top authored works 29 per keyword, top other media types (e.g., images, photos . . . ) per keyword and recently tagged works 29 of the subject keyword. System 100 also displays a list (preferably an ordered list) of related tags for further user selection (e.g., drill down manner) and navigation at the group home page 210. Other information may similarly be displayed on group home page 210 as supported by publication table 124, user tables 122 and tagging table 126.

Thus, authored works 29 in a group are searchable and viewable by group members according to: tag or keyword, rank in quality, rank in popularity or rank in number of subscriptions, rank in author quality, rank in author popularity and/or rank in number of subscriptions to author.

The content with groups may have a certain version for content syndication out onto other sites. Also, groups may have content syndicated into them via a pertinent feed such as an RSS feed, wire service or other automated technology that allows publishing content. Thus, authored works 29 for groups as well as individual users include works originated in system 100 or elsewhere.

Continuing with FIGS. 2a-2d, the system 100 further profiles the known/registered user based on material he writes and reads, what he clicks on (group, article, etc.), the query he enters and the ads he clicks, etc. This profile information is used to better target the known user with advertisement. The system 100 deduces demographic information (city, state, etc.) from a user's IP address, the type of article the user reads, search query he enters, shared behavior with other users (behavior or activities in common with) or shared relationships to other users. In one embodiment, the system 100 (a) assumes a zip code for a given user based on zip codes detected in the user's activities, (b) assumes age of the given user based on ages of others detected in the user's activities, and (c) assumes gender of the given user based on gender of others detected in the user's activities. In addition, known/registered users can browse all other members' profiles 37. They can browse only the members' public profile information and the members' articles/connections/groups/categories or tags that are flagged as public. In some embodiments, demographic data of a user is solicited from other users.

Information about unregistered users is preferably kept in the system 100 for a given amount of time (in days). If the unregistered user does not visit the invention website 60 within this period of time, any profiling information kept about this user may be discarded and the next time this user accesses the website he will be seen as an unknown user.

Figure 2A:
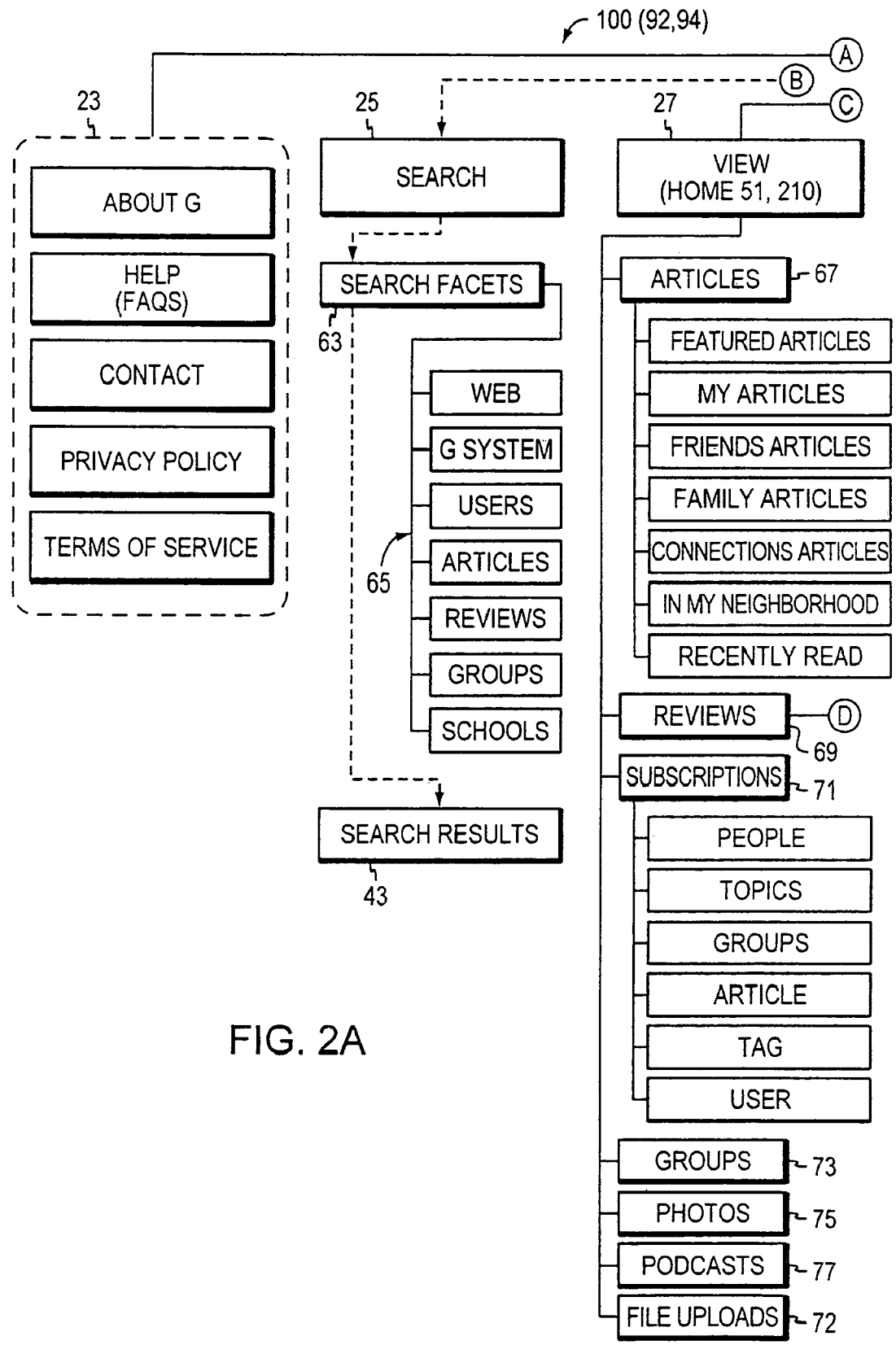
FIGS. 2a-2d are system diagrams of a website hosted by a server computer in a preferred embodiment of the present invention.
Figure 2B:
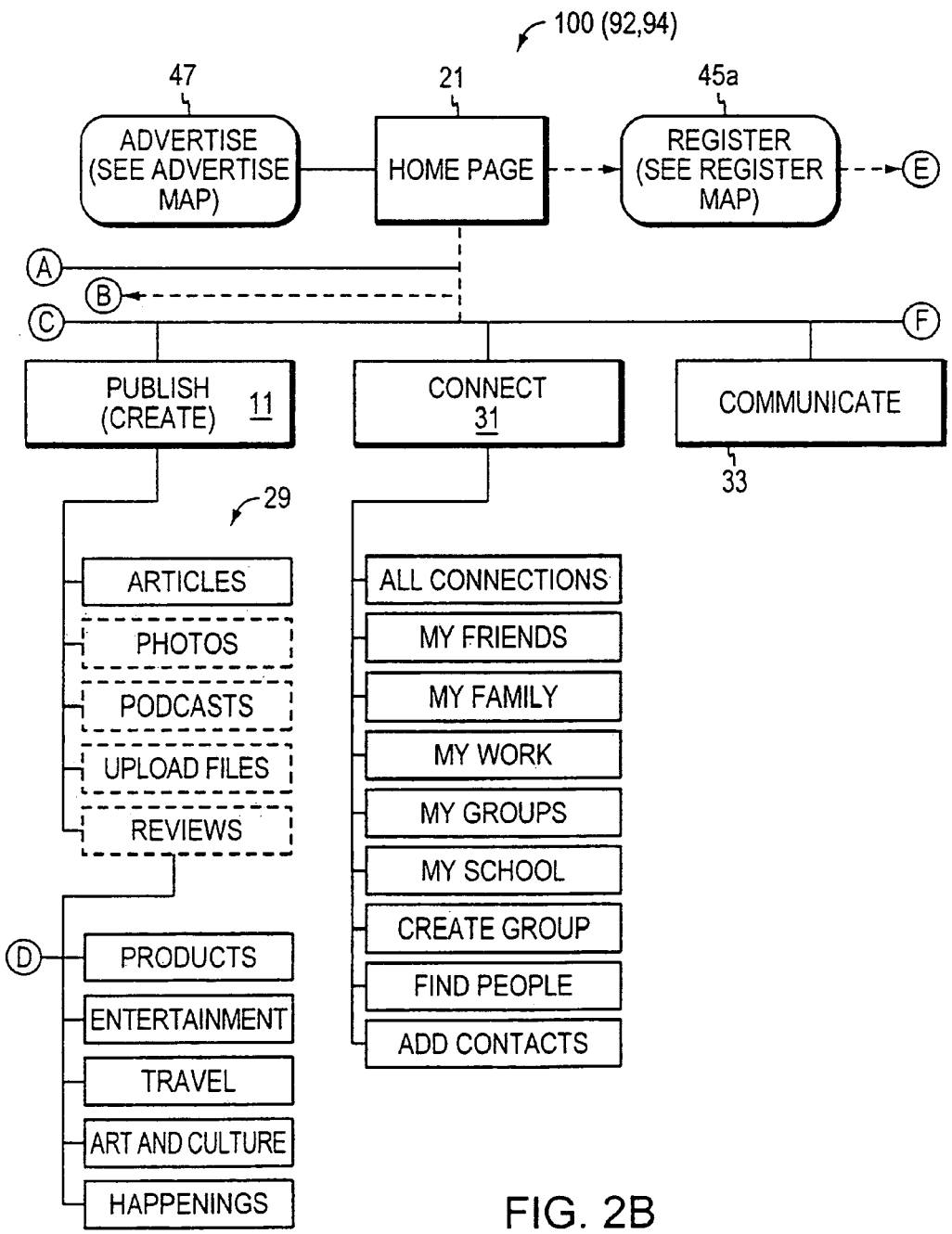

Referring to FIG. 2a, General Information 23 includes website company general information, website company contact information, site help, privacy and other policies and terms of service.

Search operation 25 is the interface to a search engine for processing user queries and generating search results 43 thereto. A relational database search engine or other data search engine may be employed. In a preferred embodiment, search facets 63 are used to filter candidate search data/results. This has the effect of narrowing available content. In one embodiment, search facets include quality rating (of authors, authored works 29, tags, comments and/or bookmarks), date, topic, time, recency of publication, length of publication, author rating (in popularity and/or quality), authored work rating (in popularity and/or quality), media type, authors per media type, reader rating, amount of tips received by the authored work 29, association with an organization or membership in a group and degrees of separation between author and user. In other embodiments, different facet options or sets are made available after use of an individual facet, and/or facets change with each drill down by the user. In some embodiments, these facets 63 are used to order contents (authored works 29) for search results but not filter the contents. System 100 displays to a user a list of authored works 29 or summaries of authored works 29 organized by any combination of user's interests, relationships, expressed or inferred interest in certain authors and expressed or inferred interest in certain topic areas or keywords.

Initial areas 65 (FIG. 2a) of search include the global network 70, the invention website 100, users of (registered with) the invention system 100, articles (authored works 29), reviews (other authored works 29), groups and schools.

View operation 27 generates screen views for display by client computer 50 to end users. An end user (individual or company/organization) may be a reader-user at times and a writer-user (or author-user) at other times. FIG. 3 illustrates the initial screen view 51 generated by view operation 27 in response to log in by a subject user.

The particular user's home page 51 in system 100 indicates articles (authored works 29) and reviews 67, 69 (FIG. 2a) respectively. The articles may be featured articles of system 100, the user's own articles, friends' articles, family articles, connections articles 76 (FIG. 3), neighborhood articles and recently read ones. Reviews 69 may be of subcategories such as products, entertainment, travel, arts and culture and happenings.

The user's home page 51 (or initial screen view by view operation 27) may also include indications of subscriptions 71 (FIGS. 2a, 3) by the user as supported by user tables 122 of FIG. 2h (discussed later). The system 100 preferably allows a user to subscribe to other people, other users of system 100, topics, groups, authored works 29 and tags or taxonomy categories and the like. Based on user input, system 100 records subscriptions 71 in respective user tables 122.

The user's home page 51 includes an indication of groups 73 (FIG. 3) the user belongs to, displays photos 75 of interest to the user, provides podcasts 77 (FIG. 2a) and user file uploads 72 (FIG. 2a). User tables 122 support display of this data.

The system 100 automatically refreshes home page 51 of users on a preset frequency (after a preset period of time has elapsed). Refreshing the screen view 51 brings in new content and advertisements.

Table 5a is the supporting data organization and structure of home page 51 in a preferred embodiment.

TABLE 5a

Representative Member home page 51
Members have a home page 51. This home page displays all
member information to the member himself and all public
information to other members determined by their privileges.

| Feature | Description |
| --- | --- |
| Display information based on privileges. | The home page shows the member's information to the respective member while other members can only see of this member what fit their privileges. |
| Customizable content and layout | The member is able to customize his home page 51. He is able to set what information he want to display and where on the page. However, he cannot prevent certain items from being displayed (e.g, navigational elements and advertising). The middle (content) pane display order and display location can be customized. |
| Home viewed by owner | The following information can be shown on the member's home page:<br>Top 4 latest articles published by the member with the newest at the top<br>Report summary on article viewing<br>User's connections that are currently online<br>Users connections<br>Articles recommended to the member by the system.<br>People subscribed to by the member with the ones that have the most recent articles (not red by the member) at the top<br>Groups the member belongs to with the ones that have the most recent articles (not red by the member) at the top<br>The members' contacts.<br>The members' bookmarks.<br>Member's recently read articles<br>Categories subscribed to with ones that have the most recent articles (not red by the member) at the top.<br>Account balance |
| Home viewed by other member | The following information can be shown on the member's home page when viewed by someone else. Clearly, this information depends on who views the page and the information view properties:<br>The members' connections<br>Latest articles published by the member and not red by the viewer.<br>Shared groups the member belongs to.<br>Public bookmarks.<br>Public subscriptions.<br>Recently read articles |
| Category published under | Member should be able to specify the "categories under which I publish" and the viewers can click on them which shows the articles written by the member in that category. |
| Tags published under | Member should be able to specify the "tags under which I publish" and the viewers can click on them which shows the articles written by member in that keyword/tag. |
| URL for home page | Members home page can be accessed via simplified URL's containing both member name and system name. |

Continuing with FIGS. 2a-2d, publish operation/module 11 enables a writer-user to create a piece (authored work) 29 formed of any one or combination of text, images, audio, video, files to download, XML descriptions of any of these items, comments and/or bookmarks. Further details are given below in FIGS. 3a-3d.

Connect operation 31 (FIG. 2b) is an address book of sorts which enables a user to specify categories and relations of people. Preferably each entry indicates one of the categories of 'family', 'friend', and 'work', and may thereby define subsets or groupings of people similarly related to the subject user. Connect operation 31 also enables users to organize groups, make a school grouping, find people and add contacts. Table 1 and the groups configuration discussed above support connect operation 31. Preferably communicate operation 33 (FIG. 2b) is an email service. Any of the known email software applications is suitable here.

Figure 2C:
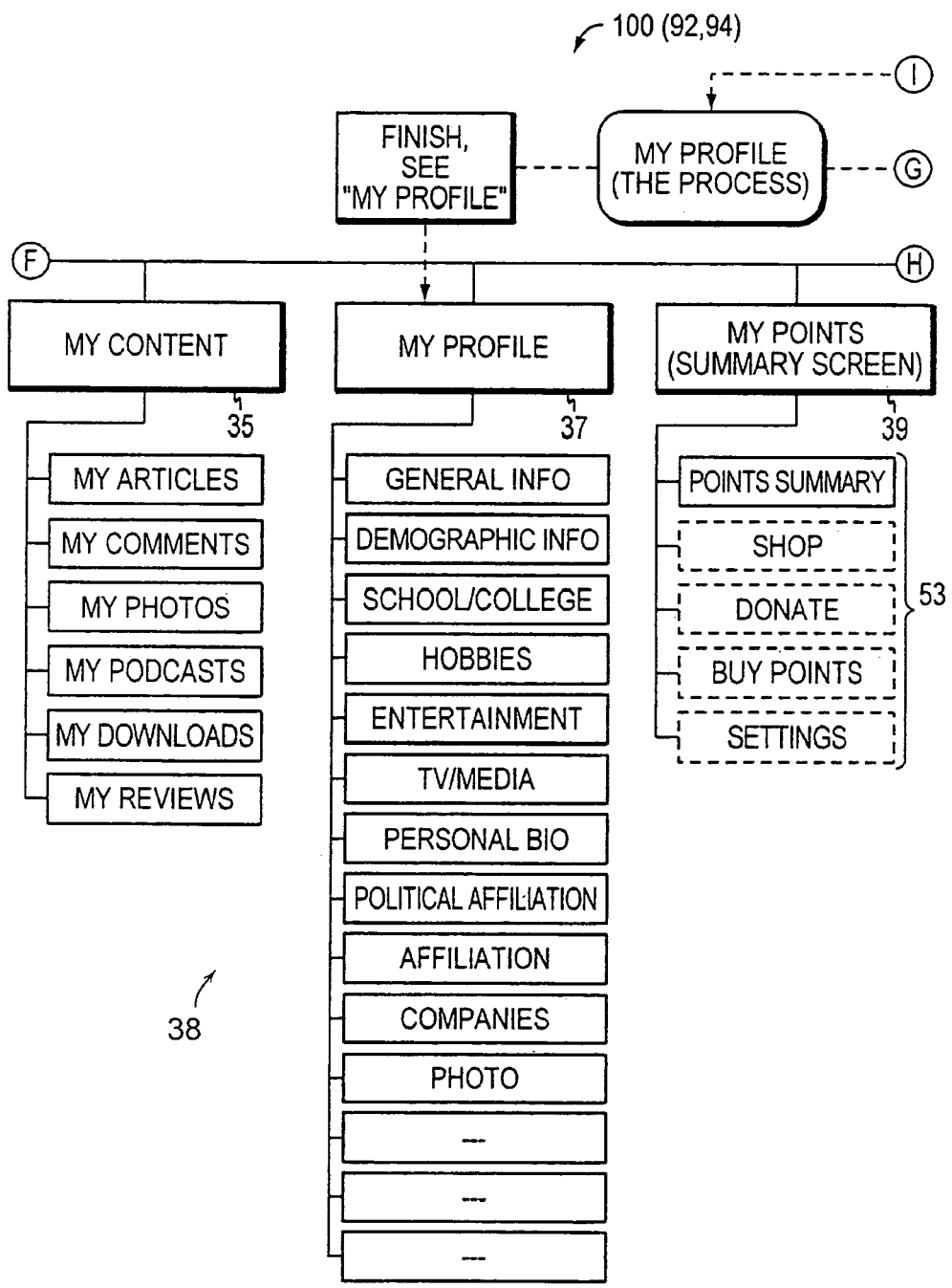
Figure 2D:
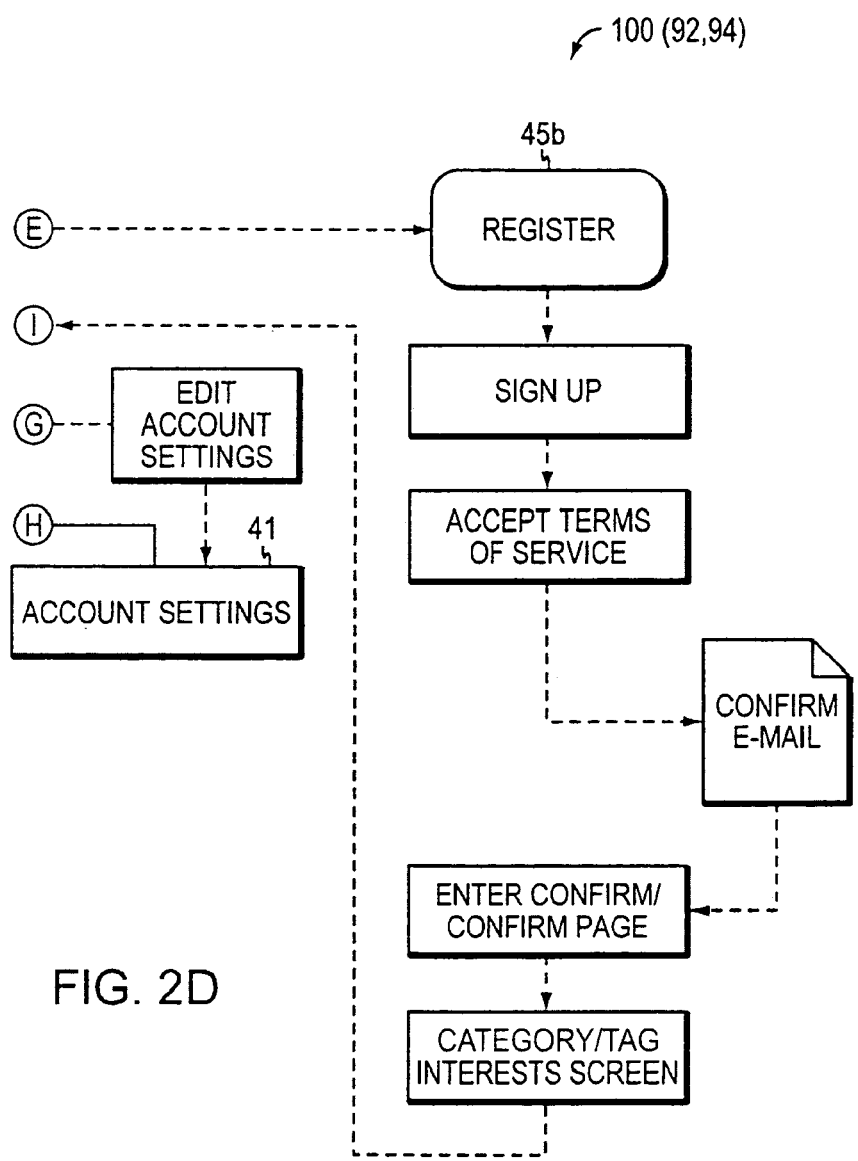
Figure 2E:
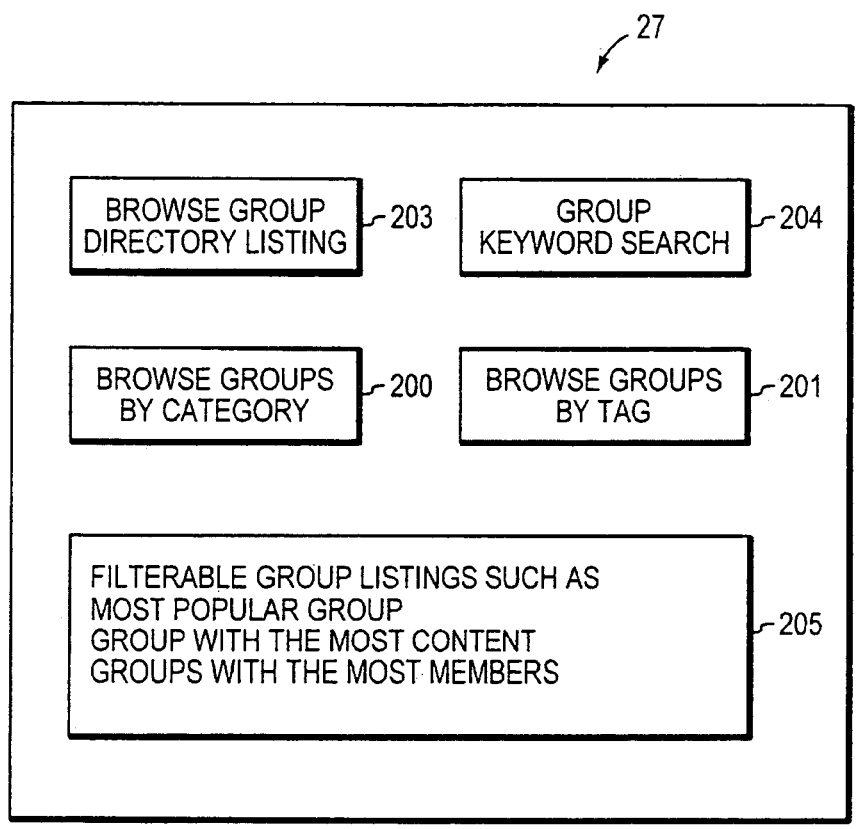
Figure 2F:
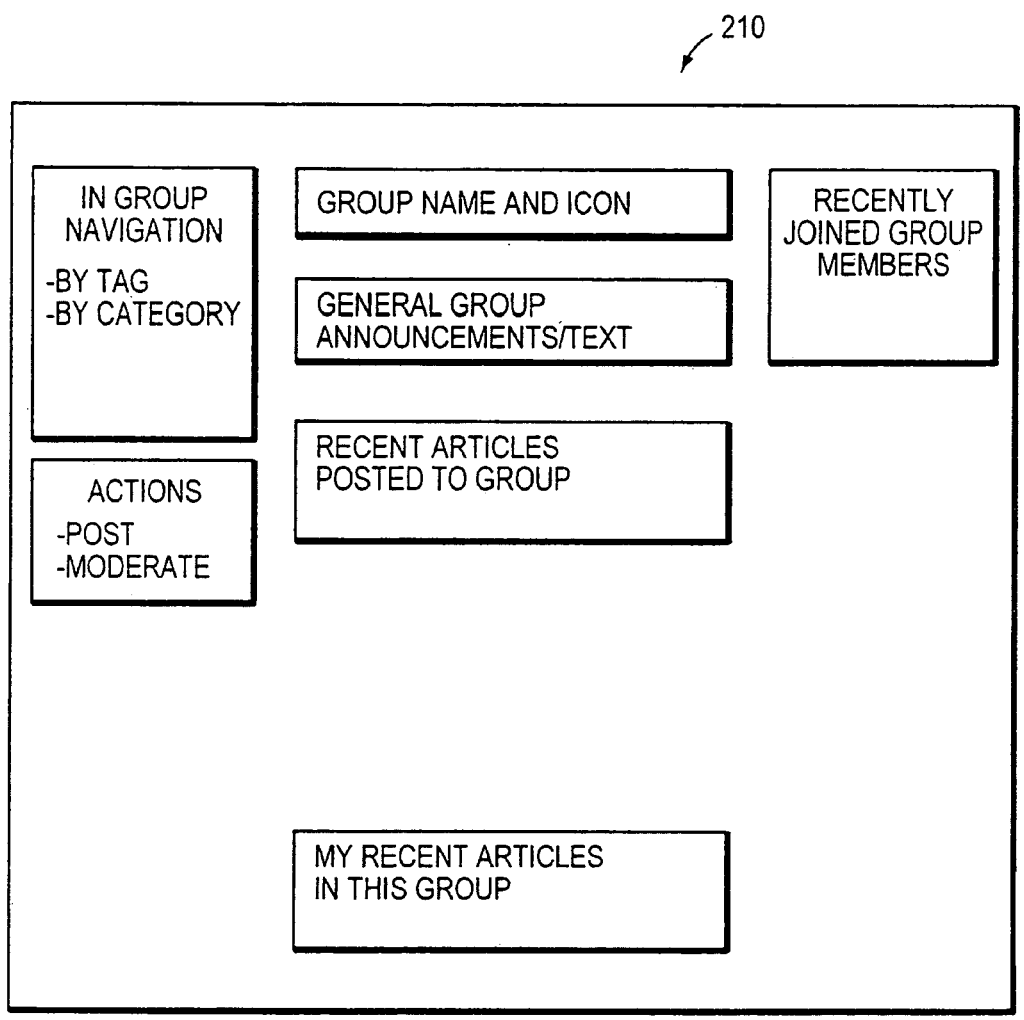
Figure 2H:
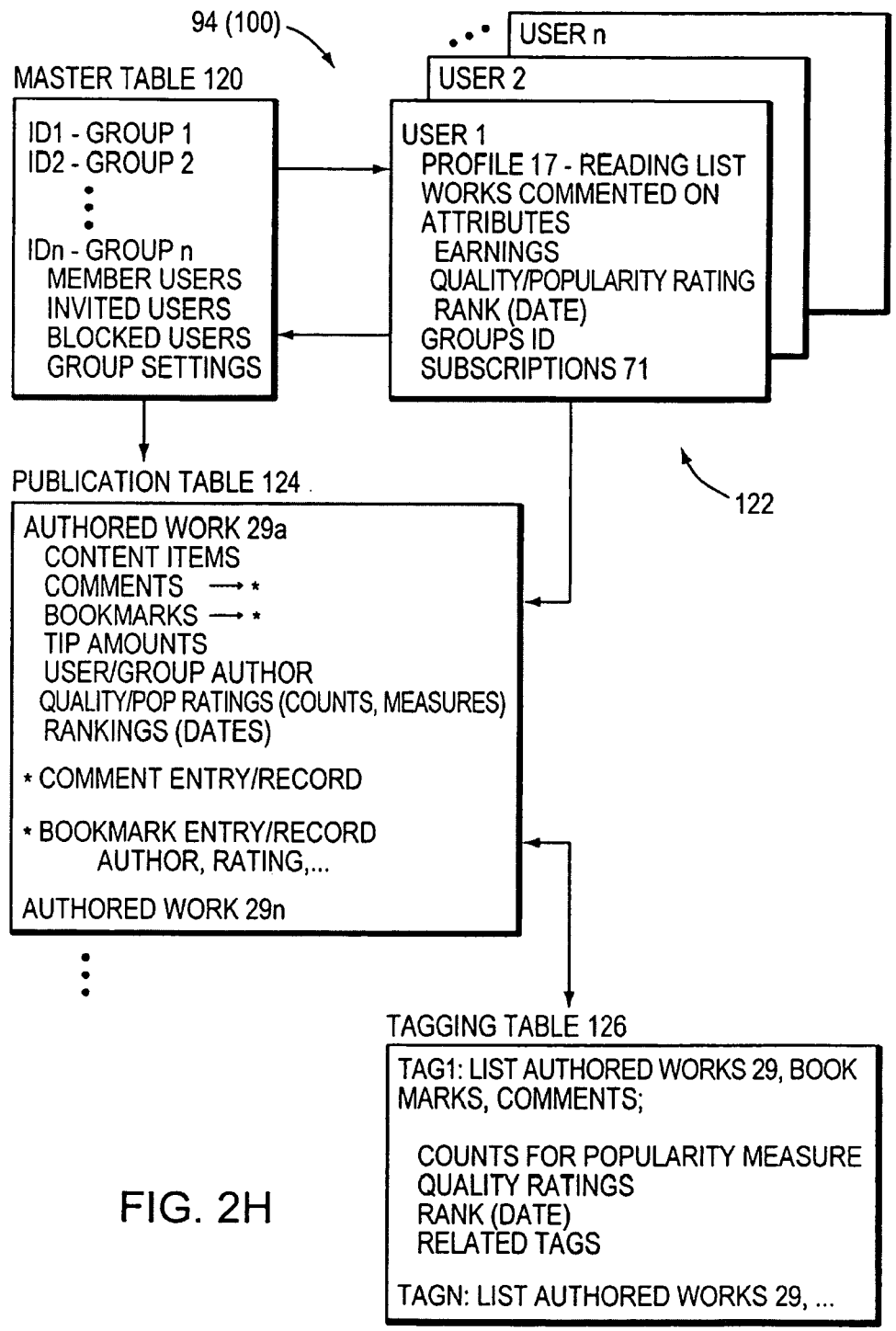
FIG. 2h is a block diagram of database tables supporting the system of FIGS. 2a-2g.

Continuing with FIG. 2c, My Content 35 stores a given user's published content 29 (e.g., labeled 'My Articles' and 'My Reviews') or elements for use in composing authored works 29. Included are images, audio files, multimedia clips, video clips, bookmarks, comments, download files and the like. Also My Content 35 includes comments the user has made on other's articles (works).

Accounting settings 41 (FIG. 2d) also result from the user profiling (registration) process 45. The present invention system 100 is preferably a point based system. Known users can earn points. However, the points can not be debited from a user's account until the user becomes a member of system 100. Known users cannot redeem points unless they have subscribed to the system 100. If they subscribe using the same browser used when browsing, their accumulated points are transferred in their newly created account (because the points will be in the cookie for example).

A user's points and other related accounting is provided by points operation 39 (FIG. 2c). Withdrawal of points, points accrual and points transactions are recorded or otherwise provided at 53 in FIG. 2c. A report generator may provide various displays and output of data from points operation 39.

Turning to FIG. 2h, a master database table 120, user tables 122, publication table 124 and tagging table 126 support the foregoing and other features of the invention system 100. Briefly, system 100 assigns a unique identifier to each group. Master database table 120 lists groups by unique identifier. For a given group, the corresponding entity in master database table 120 lists the members (user names) of the group, lists invitations (names of invitees) to the group, lists blocked users names from the group and group settings (as described above in FIG. 2g).

Each user has attributes and a profile 17 stored in a respective user table 122. This profile 17 is the combination of (a) user specified information stored in profile entry tables 38 and (b) inferred or observed user characteristics discussed above in FIGS. 2a-2d. System 100 records or indicates in user profile 17, the ads viewed and/or selected (or otherwise responded to) by the user. Other outcome of these ads (sale completed, subscription made, etc.) and the user's activity therewith may also be recorded here. For a given user, the respective user table 122 includes the groups (e.g., by respective group identifier) to which the user belongs and subscriptions 71 to other users (author users). Certain user attributes and activity are also recorded in and/or tracked by respective user tables 122. For example, in one embodiment, the user profile 17 includes an indication of authored works 29 read by the subject user and comments he has made on respective authored works 29. A pointer, link or reference or the like to a comment entry in publication table 124 provides the comment contents (text). This enables system 100 to determine and display most commenting user, most commented on user or authored work 29, commenting rates of groups and other statistics/standings or similar information. This may be done dynamically or for static stored data 94.

The publication table 124 relates who (user or group) created what authored works 29. For each authored work 29, publication table 124 indicates authored works' 29 composition or content including any one or combination of text, images, video, audio, graphics and/or multimedia, as well as users' comments on the work and/or bookmarks to the work 29. An indication of user responsible for a comment is by pointer or similar reference to the respective user table 122. Publication table 124 supports display of comments during display of corresponding authored work 29. The comments are visible to the author and/or other users. The publication table 124 entry also stores or indicates the amount of tips given to the author user for this authored work 29.

Publication table 124 also enables reports to an author showing names of reader-users who have read authored works 29 by the author and allows the author to browse profiles of the reader users. In some embodiments, the reports aggregate the profiles 17 of reader users showing aggregated data for those users. The author is then able to substantially automatically target advertising based on profiles of reader users. In a similar manner using tagging tables 126 (discussed below) with publication table 124 data, authors can see keywords most often used by reader users of their authored works 29. Indications of authored works 29 or comments are shown on a reader user's profile 17 in user tables 122 such that others can see what that user has read. System 100 further enables users to subscribe to the comments of other users to see what people they like or have an interest in are reading most frequently.

Each bookmark and each comment has a respective entry (or record) in publication table 124. In one embodiment, each bookmark entry has a URL or pointer like reference, a title, a synopsis and/or indication of author. The bookmark entry may also provide a snapshot (summary) of the respective bookmark or be reproduced in its entirety (full text/graphics data). The bookmark entry also stores any additional annotations or comments by the creator of the respective bookmark. The bookmark record includes popularity and/or quality ratings similar to those employed for authored works 29 described above. A counter or similar mechanism keeps track of number of bookmarks a given work 29 has. The bookmark records and entries in publication table 124 enable system 100 to determine and display to a user his bookmarks, other user's bookmarks and/or all system bookmarks, as well as display an indication of popularly bookmarked authored works 29 and the like.

In one embodiment, the bookmarking means enables the user to selectively make visible to other users and authors each bookmark. System 100 then enables users to comment on and rate quality of bookmarks. As such, system 100 further displays (i) lists of bookmarks based on popularity and/or quality rating, (ii) an indication of bookmarks having greatest increase in popularity and/or quality rank, and (iii) an indication of bookmarks having greatest decline in popularity and/or quality rank.

Each comment entry (record) in publication table 124 indicates author of the respective comment, authored work 29 (or bookmark) and/or author of work/bookmark to which the comment is aimed, and text of the respective comment. Common relational database techniques are employed to organize the comment records by and display lists of most prolific author of comments (most commenting author user), by author user or authored work 29 most commented on and/or by best comments on a given work 29 or bookmark.

The publication table 124 entry for a given authored work 29 also links to or otherwise references through tagging table 126 keywords or tags that users (author user as well as reader users) have assigned to the authored work 29. Similarly, tags may be associated with bookmark or comment entries/records in publication table 124. In some embodiments, the publication table 124 entry for a given authored work 29 also indicates categories/subcategory (topic areas) that users (author user, reader users) have assigned to the authored work 29.

The tagging table 126 indicates particular tags or keywords applied respectively to authored works 29, bookmarks and comments in publication table 124. In particular, for a given keyword, tagging table 126 lists content items/authored works 29, bookmarks and/or comments that have been assigned that keyword. Using common cross-indexing (cross-referencing) techniques between tagging table 126 and publication table 124, system 100 provides lists (hierarchy orderings) of related tags per authored work 29 or topic area. For example, in response to a user using a keyword in operations of system 100, the system utilizes tagging table 126 and presents a list of additional keywords that often appear together with the keyword. The additional keywords are user selectable for further specifying operations of the system 100. Upon user selection of one of the listed additional keywords, the system 100, through tagging table 126, presents further additional keywords for additional user selection.

In some embodiments, each tag (keyword) has a respective record in tagging table 126. For a given tag, the respective table entry (record) indicates number of times the tag has been bookmarked, commented on, included in an email message in communication subsystem 33 or cited in other works in system 100. This counting enables system 100 to make a popularity determination of the tag. Separate popularity measures and indications may be made for reading purposes, writing purposes and/or discussion. System 100 determines quality of the tag based on responses/feedback from users indicating alternative tags or indicating that a tag is being incorrectly used (deceptive, inaccurate, inappropriate, etc.) The foregoing allows system 100 to indicate various quality and/or popularity ratings of the tag, e.g., fastest increase in popularity rank and fastest decrease in popularity rank.

Based on the above ratings, system 100 also ranks the tags. The records in tagging table 126 indicate rank of a tag over a period or time or within a certain time frame (for example, the prior week or the current week). System 100/tagging table 126 also tracks rate of change in rank of tags so that a display of fastest incline in rank and/or fastest decline in rank may be made.

In one embodiment, the top certain number of keywords most frequently suggested are displayed in ranked lists for navigational purposes. The ranked lists include a list of keywords most often published by, a list of keywords most often commented on, a list of keywords most often selected by readers, a list of keywords most often searched on and/or a list of keywords most often forwarded in email messages. Tagging table 126 may also record, cross reference or otherwise indicate tags most commonly used together. The system 100 further identifies multiple different spellings of a word including misspellings. The system means links each identified different spelling to a most frequently used, properly spelled term for that word and displays that term instead of the other spellings in system screen views. In response to reader users selected or suggested keywords for an authored work, the system means provides additional keywords for selectable use as tags to the subject authored work 29. For each additional keyword, when not selected by a reader user or author, the system marks the additional keywords in tagging table 126 as negatively correlated to the authored work 29. The negative correlation grows stronger each time the system means suggests additional keywords to an author or reader user and the additional keywords are not selected by the user.

Reader-users (or an end-user in general) log into the invention Web site system 100 hosted by server 60 and search for specific content or browse for various content through invention software 92, 94 (search operation 25, view operation 27). As mentioned above, FIG. 3 is illustrative of initial screen views 51 rendered by view operation 27 and displayed to the end-user. In a preferred embodiment, the reader-user subscribes 71 to content offered through the Web site/system 100 by any combination of author, topic, related people and/or groups/organizations. Users are also allowed to establish connections of different types with their family, friends and work colleagues that allow them to see (at 55, 76, FIG. 3) material written by and/or read by these connections. Connection operation 31 through user tables 122 supports this function. Additionally, end-users may choose to see content published for their local area or regions to which they might travel.

Ad Targeting

An ad service subsystem (member) 99 (a) filters and selects ads based on end-user browsing history and profile 17 characteristics, and (b) scores candidate ads in combination with expected click through rate and an advertiser's bid in a manner that maximizes host site 60's expected revenue from ad clicks (user selections of ads). As illustrated in FIG. 4, the ad member's 99 main task is to match advertiser-specified targeting criteria with characteristics of users being served ads (step 91). In general, a request 56 from a Web page server or other requester (i.e., in response to user interaction, searches and the like) is considered to match an ad if the request contains all properties that the ad is targeted to. For instance, if the ad is targeted to end-users who are males looking at political pages, it will match a male aged 40 living in Arizona viewing a political page. In other words, the extra characteristics of the end-user do not count against the ad as a match. However, an ad that matches more of these characteristics will be considered a better ad than one that only matches one or two characteristics and will tend to be scored higher by member 99.

If any targeting characteristic of the ad does not match the current end-user, the ad is ineligible to be shown. So an ad targeted to males aged 35-45 will under no circumstances be served to a male aged 50. Also, being gender specific, it will not be shown to an end-user of an unspecified gender, even if that end-user is in the proper age range. Only if the request contains all the characteristics the ad is targeted to will the ad be shown to the subject end-user. However, the user's keyword history may allow an ad to be shown even if the ad does not match the current page.

Even when the ad system matching routine 91 has selected a set of ads that are eligible 93 to be shown to a given end-user, some ads may be more pertinent than others. For instance, an ad targeted to a keyword recently seen by the end-user should be and is given preference over one targeted to a much more distant keyword. Also, ads that have high click through rates are preferred to ones that have low rates, and ads that the advertiser has bid a higher amount are preferred to ones that have a minimal bid.

At steps 195 and 96, the ad system 99 attempts to balance these possibly competing factors by using them as multiplicative factors in an ad's overall score. The following are the types of factors that are applied. More details about the scoring are given below.

Keywords are scored higher if they have been encountered recently, or if they are encountered frequently. These scoring criteria are given relatively high weight, as these are likely to be the best way to keep the ads being shown a user "fresh".

Continuing with step 96, an ad that is more specifically targeted to an end-user is given higher priority than a less specifically targeted general ad. So an ad that is targeted toward gay males, ages 25-34, income over $75,000 will be given higher priority over an ad simply targeted toward males, if both match the same user. Of course, the less specifically targeted ad is eligible for display to a wider audience.

To maximize expected revenue to host 60, ad system 99 displays ads that are proving themselves successful by showing high click through rates. Therefore, at step 97 the ad's score is multiplied by the click through rate. In order to give a new ad a "fair chance", its actual click through rate is calculated as a weighted average against a configurable number of impressions at the advertiser's overall click through rate. A similar balancing mechanism is used to infer an assumed click through rate for a new advertiser.

An advertiser is allowed to place a bid on his ad, for example the maximum he would be willing to pay for a click through (though for any click, i.e. user selection, he may pay a smaller actual amount). An ad with a higher bid is ranked higher by simply multiplying the ad's score due to other factors by its bid (step 98). Next ad system 99 determines the greater of the calculated amounts of steps 97 and 98. On output, ad system 99 provides an ordered set (by priority) 89 of qualifying ads in response to host system 100 request.

In one embodiment, the following types of ad targeting criteria are used.

Keywords

A set of keywords or key phrases may be provided with every ad request, representing keywords associated with the current page the user is on. The ad system 99 is provided these keywords as input. In other embodiments, ad system 99 may attempt to extract keywords from the current page context.

Keyword History

Every keyword is stored as part of a user profile 17. The profile 17 contains the user's history of keywords viewed, though it may be pruned if the history grows too large. The keywords are organized by recency and frequency. The keywords that are viewed more recently or more frequently are given preference or weighted in various calculations and determinations of ad system 99. Ads may be targeted to keywords. Ad system 99 enables display of a keyword targeted ad for end-users who have those keywords in their history. End-users that have not viewed those keywords will not see such ads.

In one embodiment, system 100 stores in the user profile 17 keywords read by the user, keywords written by the user, keywords searched (in search queries) by the user, keywords browsed by the user, keywords forwarded, received or sent in email messages by the user, and keywords in bookmarks or comments by the user. Also included in various combinations are keywords of tags and categories of content read or written by the user, recency of these keywords and frequency of these keywords. In some embodiments, tag keywords and/or category keywords are expired in the user profile 17 based on recency or frequency. Thus profile 17 records or otherwise tracks date and time of keywords of the user.

Static User Properties

Unlike behavioral properties such as keywords visited, end-users also have many relatively static properties, such as age, income range, and so on. Some of these properties may change over time and others once noted never change, but in general they are thought to be static properties of the end-user. System 100 and ad member 99 expect these properties to be explicitly supplied by the end-user as part of entering their registration profile 37. Both demographic and geographic properties fall into this general category and in one embodiment include the following criteria: Age, gender, income level, state of residence, NPR listener, relationship status, sexual orientation. The system 100, 99 is designed so that this list is flexible, and can be added to or modified with relative ease. In one embodiment, the properties of gender, age and residence exist directly in the user table 122 and the remaining properties are in the profile entry table(s) 38, FIG. 2*c*. Also, some information must be passed through a filter before it is usable. For instance, in some embodiments host system 100 infers age from date of birth and residence from IP address. Other properties may be inferred.

Architecture

Turning to FIG. 5, the ad system 99 is preferably formed of three main components, namely a user interface (described below in FIGS. 6*a*-6*k*), an indexer 85 and an ad engine 87. The user interface allows advertisers to enter ads into the system 99 and assigns targeting criteria to the ads. In particular, the ad system 99 prompts the advertiser-user for targeting criteria and in turn assigns raw targeting criteria to ads.

The indexer 85 component periodically scans the database 110 of current ads and creates an index 81 that permits easy searching and retrieval of relevant ads when a request 56 is made in real time. Preferably, Lucene (by the Apache Software Foundation) is used as the indexing and searching engine/subsystem. Other indexing and searching techniques may be employed.

In the indexing phase, all ads that are currently eligible to be displayed are selected and placed into the index 81. Filters are applied by campaign start and stop dates, and a series of statuses on the ad, campaign, and advertiser. Additionally, campaigns that have expended their budgets for the day are shut off.

For each ad, its targeting criteria are indexed to it, so an ad that is targeted to keyword "software" will be assigned a value "keyword:software" in the index. The same is done for all such properties, such as "gender:male". Multiple values for a property may be used, such as "state: IL IN OH MI". If a target is not specified for a given criterion type, a field value such as "income:null" is created.

Additionally, a boost is added to the ad based on the effective click through rate (as described above, a formula to assume a click through rate for an ad that is new to the system is used) and its bid. These factors are multiplied together and assigned as a "boost" to the ad in the index. Lucene has limitations in the precision with which a boost is stored, so indexer 85 also assigns an adjustment factor to the ad in the index. Because ad system 99 relies on the score of the ad to determine the actual cost of a click, ad engine 87 multiplies by this adjustment factor when computing the ad's score.

The ad engine 87 receives requests 56 to display ads. Each request 56 includes criteria (such as keywords, user keyword history characteristics and static user properties/profile characteristics) as working parameters. For a given request 56, the ad engine 87 considers the criteria/characteristics of the request 56, such as the keyword history and profile 17 characteristics of the desired end-user, and searches the index 81 for relevant ads, scoring them by relevance. Preferably ad engine 87 employs the routine of FIG. 4 for searching and selecting an ad to serve in response to the request 56. In turn, host system 100 displays to the end-user the ad chosen by ad engine 87/ad system 99. If the end-user selects (clicks on) the displayed ad, ad system 99 compares the ad's score with the score of the next lower ad in the display order 89 to determine how much the click should be billed/charged out to the advertiser, as described below.

Since the index 81 is a resource shared between the indexer 85 and the ad engine 87, a synchronization mechanism exists to prevent contention. The indexer 85 works on a separate instance of the index 81 from the ad engine 87. When the indexer 85 is finished, it sets a flag to indicate the newly created index 81 is ready to use. The ad engine 87 begins to use it 81, freeing the previous index to be refreshed when the indexer 85 starts up again.

When the ad system 99 receives an ad request 56, it creates a query that retrieves appropriate ads from the index 81 (through ad engine 87). The query is constructed based on the current page keywords, past keywords seen by the user, and static user properties.

The current page keywords are supplied in the URL of the ad request 56. They are entered into the user's keyword history for future retrieval. They are date stamped so that recency can be tracked, and if they are encountered in the user's history already, a counter is incremented so that frequency can be tracked. Based on the recency and frequency score, a boost factor is assigned to the keyword. At the end of this process, a query of the following form is created: "keyword:word1^boost1 word2^boost2 word3^boost3 . . . null". The final factor of null is required to retrieve ads that are not targeted to any keywords at all.

Additionally, a viewer-user profile 17 is created from all the static properties determined (inferred) of the viewer-user. For any property type in which one or more values is found, ad member 99 constructs a query clause of the form "property:(value1 value2 value3 . . . null^0.5)". The final null insures that ads not specifically targeted to this property are also retrieved, but not scored as well as any that match one of the values. For any property that the viewer-user has not specified, ad system 99 adds a criterion of the form "property:null".

The foregoing clauses are appended together in a conjunctive manner so that the final query looks something like this: "+(keyword:mathematics^10 games^5 null)+(state:ny pa va nj null^0.5)+(gender:male null^0.5)+(income:null) . . . ".

Ad engine 87 retrieves ads from the index 81 by means of this query. The retrieved ads are then ordered by decreasing score (preferably after an adjustment is applied to work around precision limitations in Lucene's scoring system) and displayed to the end-user (viewer-user). If an ad is clicked on (selected by the end-user), an adjusted bid is computed based on the ad's relative score to the next ad beneath it in the display priority 89. The adjusted bid is such that it is just enough for the ad to maintain its position against the next lower ad, assuming that ad were at its full bid, i.e. such that (Adjusted bid)$_1$*score$_1$>(Actual bid)$_2$*score$_2$. In one embodiment, a minimum of $0.05 per 1000 impressions is charged per ad regardless of this score.

In some embodiments, ad system 99 provides a "more ads like these" option or link to the viewer-user. This is accomplished by ad system 99 searching ad database 110 to find similar ads based on targeting type, product type, geographic region, product cost range, language and keywords. The system 100 may display to the viewer-user an option to view other similar ads based on categorization of a currently displayed set of ads. Upon viewer-user selection of this option, system 100 displays one or more similar ads while maintaining display of at least one of the originally displayed ads. Further system 100 enables the viewer-user to respond to the other similar ads and/or for each similar ad, provides a respective option to display more ads similarly categorized.

In one embodiment, system 100 enables the advertiser user to (i) bid additional money to prevent display of the above-described option, or (ii) pay a fee to remove display of the option. In this case, during the ad creation and set up (budgeting and bidding part), upon the advertiser-user indicating such additional amounts/fee, system 100 is responsive and sets a flag or attribute value/parameter of the ad accordingly. The ad with its display and other attributes including a "do not display more like these option" is stored in database 110.

In other embodiments, ad system 99 displays ads from index 81 including ads that the given viewer-user has previously seen. Using user profile 17 of the given viewer-user, system 100 identifies the ads that this user has responded to in the past. System 100 provides the viewer-user an option to see ads (or lists thereof) that he has previously viewed or responded to. In one embodiment, system 100 displays ads (or lists thereof) that the given viewer-user has previously viewed and highlights or otherwise indicates which of these he has previously responded to. Certain ads may be omitted.

In addition, using user profiles 17, system 100 enables other users (such as advertiser-users) to see the ads that a given end user has responded to in the past. This enables a given end-user to see ads that his friends, colleagues or other connections 31 have responded to in the past. This also enables a user (company) to see, aggregated in a single place, ads that have been viewed by those who have linked to that user's home page 51 or effective website. In some embodiments, system 100 enables the given end-user to determine whether other users can see what ads he has viewed. The system 100 sets an appropriate variable or attribute in user profile 17 to accomplish this.

Using user profile 17, system 100 sorts ads by popularity. Similarly using user profiles 17 and ad database 110, system 100 enables a user to sort ads previously viewed by another user or group. Sorting may be by advertiser, product type, recency of viewing, frequency of viewing and/or advertiser rating or ranking. A default sorting for a user may be applied.

CPC (Cost Per Click) Bid Management

Overview

The host company 60 ad service algorithm may charge the advertiser a flat fee for every click through. For example, the fee charged is the bid that the advertiser entered for the ad. The bid is relevant to the placement of the ad, so it is reasonable to charge a higher price for having an ad placed higher, but an advertiser might vastly overbid and thus spend much more money than is necessary to guarantee his ad placement.

Other ad engines, such as Google, institute bid management functions that mitigate this problem for advertisers. Suppose that ads A-D are to be shown to a user, with the following bids:

| Ad | Bid |
| --- | --- |
| A | $.50 |
| B | $.25 |
| C | $.15 |
| D | $.10 |

Google would rank the ads as shown, but instead of charging the advertisers per click by the amount of the bid, they'd charge for each ad at $0.01 more than the bid of the ad beneath it, in other words, just enough to maintain its position. So ad A would be charged at $0.26, and so on. Ad D would still be assessed a cost per click (CPC) of $0.10.

Details of Invention Bid Management

Unlike Google, Applicants take other factors into account in ordering ads besides bid amount. Applicants do not use the simple bid management algorithm outlined above, because the ads might be out of order from the standpoint of the simple bid. Instead, Applicants order ads by an estimate of their expected value to host site (company) or ad network 60. The bid factors into this, but Applicants also incorporate the likelihood that the ad will be clicked upon (selected by a viewing end-user). The product of (i) the bid amount and (ii) the likelihood of the ad being end-user selected (clicked on) defines the invention expected value, which is used as the ordering criterion in ad subsystem 99.

Estimating the click likelihood is a complex task. A very rough estimate may be obtained by the past click through rate of the ad or similar ads. For the purposes of simplicity in description of the preferred embodiment, what is necessary is that one has some way of calculating an estimated probability of clicking (a number between 0 and 1). This number is multiplied by the bid amount to determine an expected value.

Click likelihood may be set fairly high (close to 1) when the ad is focused on a certain author or specific story (content) for example.

Consider the same situation as above, but now with the estimate of click probability included:

| Ad | Bid | Click probability (%) | Expected value |
|---|---|---|---|
| A | $.50 | 1 | .5 |
| B | $.25 | 2.5 | .625 |
| C | $.15 | 0.5 | .075 |
| D | $.10 | 1 | .1 |

Notice now that the ads should be ordered differently. B should be ordered before A and D before C.

This also means that the bid adjustment should be different. If one used the Google mechanism, a click for ad B would cost $0.01 more than A's bid, or $0.51. Obviously this is wrong, because it's more than B's maximum bid amount. Instead, one needs to find the bid that makes the expected value just exceed the next lower ad's. If B's bid were $0.20, its expected value would be 0.5 (=$0.20×2.5) and it would be tied with A for rank. Therefore, B should be charged $0.21 (which is $0.01 more than the $0.20 bid amount that made the expected value just exceed that of ad A). Similarly, if D's bid were $0.075, it would tie with C in expected value and thus in rank. Therefore, D's bid should be $0.08 (=$0.01+$0.075).

The formula for a tie bid is y=(Expected value of next lower ad)/(Click probability of the subject ad). The adjusted bid for the subject ad is then (y+$0.01), or in the case of a fractional cent, the calculated sum rounded up.

Ordering the above table properly and filling in the adjusted bids, one gets the following:

| Ad | Maximum bid | Click probability (%) | Expected value | Adjusted bid |
|---|---|---|---|---|
| B | $.25 | 2.5 | .625 | $.21 |
| A | $.50 | 1 | .5 | $.11 |
| D | $.10 | 1 | .1 | $.08 |
| C | $.15 | 0.5 | .075 | $.15 |

In one embodiment, a combination of the ad's current click rate, along with keyword recency and frequency for the end-user is utilized. If an ad is just getting into rotation, the click through rate (CTR) cannot be accurately calculated immediately. In order to give the ad a "fair shake", Applicants assume some rate until there is enough data to estimate the actual rate (CTR). One way to do this is to "blend" the assumed click through rate with the real rate using a weighted average until enough impressions are received. Suppose one assumes a 1% click through rate, and wish this to be effective until about the $10,000^{th}$ impression, at which point one wishes the real click through rate to be considered. Then one can use the formula [(1%*10,000)+# actual clicks]/(10,000+# actual impressions) to give an adjusted click rate. If the actual click rate were 0.5%, this function would behave as follows:

| # Impressions | Adjusted CTR |
|---|---|
| 0 | 1% |
| 1,000 | 0.95% |
| 5,000 | 0.83% |
| 10,000 | 0.75% |
| 20,000 | 0.67% |
| 50,000 | 0.58% |
| 100,000 | 0.54% |

As the number of impressions increases, the adjusted click rate approaches the actual click rate, but gives the ad a fair chance to be displayed before the ad targeting system 99 has any data about it.

The 1% and 10,000 used as constants in the example formula above are only used to make the mathematics look simpler. In actual application, an embodiment begins with 3,000 as the assumed number of impressions (though this may be an adjustable parameter). The click through percentage serves as the advertisers' average click through rate across all their ads. If it's a new advertiser, it will be the average overall click through rate.

It is understood that different embodiments may employ different units for bid amounts and may display different responses in them. For example, one embodiment receives input dollar amount per number of views (impressions) and in response indicates likely number of impressions resulting and average placement of the subject ad for the input dollar amount. In other embodiments, the input dollar amount is cost per click-through or cost per sale completed or cost per registration completed. And the response indicates likely number of click-throughs resulting, average placement of the subject ad and total cost of the subject ad.

The foregoing ranking 89 (based on projected likelihood of end user selection of the subject ad multiplied by respective bid amount) may include subsequently degrading the projected likelihood of the end-user selecting the subject ad every N times one of the ads is viewed by the end-user but not selected by him. N is greater than zero. Other schemes for degrading rank of an ad or effectively expiring an ad are suitable.

Accordingly, the present invention ad targeting system uses a bid technique that is akin to a Vickrey auction where the highest bidder wins but pays at the price of the second highest bid. FIGS. 6a-6k illustrate the user interface for advertiser users of invention system 100.

Illustrated in FIG. 6a is a first screen view or web page 132 of module (47 (FIG. 2b) for registering as an advertiser-user of a system 100. The advertiser-user enters company name, his name and contact information in respective fields. Continuing with advertiser-user registration 47, FIG. 6b illustrates the next step 134 in this process in which the advertiser-user creates a first advertisement for placement in system 100. The module 47 prompts the advertiser-user to name the subject advertisement and to name the campaign to associate the subject advertisement. A campaign may have many advertisements and the advertiser-user may subsequently add ads to a campaign. Working web page/screen view 134 further prompts the advertiser-user to provide a headline and description of the subject ad, as well as a display URL and destination URL (hyperlink) among other parts of the ad.

Figure 6C:
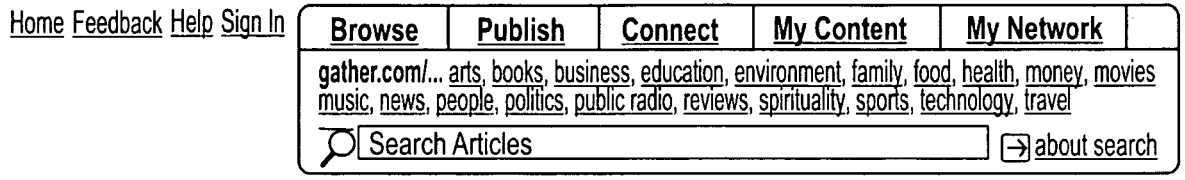

FIG. 6c illustrates the screen view 136 in which the advertiser-user indicates keywords for the newly created subject ad. As previously described, the keywords indicated here (and hence defined for the subject ad) are used to match keywords on a web page that a system 100 user is viewing or keywords in a user profile 17 to determine applicable placement of the ad. Thus the number of keywords specified by the advertiser-user in screen view 136 impacts the reach of the subject ad. Using fewer keywords makes the ad very focused while using more keywords increases the frequency that the ad is shown/displayed in system 100. Module 47 stores the newly created (subject) ad and corresponding keywords in ad database 110 accordingly.

FIG. 6d-1 and FIG. 6d-2 illustrate the screen view/web page 138 in which the advertiser-user creates the profile of an ideal customer for the item being advertised in the subject ad. Screen view/working page 138 prompts the advertiser-user to name the profile (for identification purposes) and to specify pertinent gender, age group, household income, marital status and the like for the ad targeting profile. Ad targeting profiles are stored in ad database 110 and appropriately associated with respective ads.

Figure 6E:
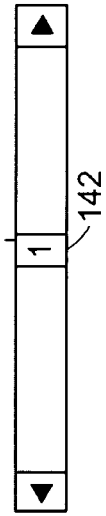

Continuing the first ad and registration process 47 with FIG. 6e, the advertiser-user establishes a budget for the newly created ad. Screen view/web page 140 enables this by providing a "maximum CPC Bid" (cost per click) field 130 and a "Daily Campaign Budget" field 131 for the advertiser-user to insert respective values. The maximum cost-per-click bid is the maximum amount that the advertiser-user is willing to pay per viewer-user selection (click) of the subject ad. The higher this bid amount the more frequent the ad will be displayed in system 100. Recall that the ad system 99 optimizes the ad billing by charging one cent more than the next highest ad bid, up to the maximum CPC bid. These field values 130, 131 are stored with or otherwise indicated for the subject ad in ad database 110.

The "Daily Campaign Budget" settings 131 allow the advertiser-user to control his budget and to set how much he is willing to spend on each campaign in a day. For this purpose, system 100 calculates cost as the number of clicks multiplied by the amount of actual CPC (cost per click) for the subject ad. When the allotment (as set by the value entered by the advertiser-user into the "Daily Campaign Budget" field 131) is reached, system 100 pauses placement (display) activity of the subject ad and resumes such activity the following day.

In one embodiment, screen view 140 includes a graphical illustration of the change in projected number of users viewing (impressions) the subject ad per day with a change in bid amount. A slider or other graphical interface element 142 enables the advertiser-user to indicate a bid (CPC) amount, and in response system 100 (ad system 99) generates graph 144 showing number of impressions per day versus cost per number of impression for the subject ad, or projected number of user click throughs per day versus cost per click (user selection). This serves as a forecast of the effectiveness of specific bids in terms of the number of clicks projected per impression. The user profiles 17 in user tables 122, the records of ads stored in database 110 and the customer (ad targeting) profile and keywords defined for the subject ad support system 100 in making these projections and generating graphs 144.

System 100 stores each of the aspects of the newly created ad as specified by the advertiser-user throughout screen views 132, 134, 136, 138, 140 (including bid and budget fields 130 and 131) of FIGS. 6a-6e in ad database 110 or supporting tables thereof. Included are ad attributes of advertiser type, product type, geographic region, product cost range, language, do not display "more like these" option start/stop campaigns and keywords.

A last screen (web page) 146 in the advertiser registration process/module 47 is illustrated in FIG. 6f. The working screen view 146 establishes information for billing the advertiser-user. Included are billing address and charge account (e.g. credit card) information or the like.

After the advertiser-user has successfully become a registered member (advertiser-user) of system 100, he can take advantage of the various features and aspects of system 100 as a reader-user and/or writer-user (as described in related U.S. patent application Ser. No. 11/371,462) as well as being an advertiser-business affiliate of host site (company) 60. In that respect, the advertisements he places in system 100 may be treated like authored works 29 which other users rate and rank and for which he is compensated following the writer-compensation program detailed in the related patent application. In one embodiment, the rate of compensation differs depending on whether the ad placement was paid by cash or system 100 credit. Publication Table 124 and ad database 110 records support this. In another embodiment, only users who selected the displayed ad or who made a purchase through the displayed ad rate the displayed ad as an authored work 29.

Turning to FIGS. 6g-6k, the user-interface for a registered advertiser-user of system 100 is illustrated. Subsequent to registering and placing a first ad, the advertiser-user may view, edit and add campaigns, ads and customer (ad targeting) profiles. FIG. 6g illustrates the screen view/web page 148 that enables the advertiser-user to obtain various reports of campaigns, advertisements and the like. In one embodiment, the reporting function enables reporting to advertiser-users indications of ads currently or actively being displayed and those selected by end-users. Reports include any combination of number of sales, number of subscriptions and number of registrations made by end-users through respective ads. Subscriptions here may be to company (advertiser) website, etc.

System 100 enables reports to be filtered by demographics, keywords, category, context and/or end-user behavior. This is supported by the user profiles 17, customer (ad targeting) profiles, corresponding keywords and other attributes recorded for ads in database 110. In a same light, system 100 enables reports to show a breakdown or groupings by demographics, keywords/phrase, category, context and/or end-user behavior.

Figure 6H:
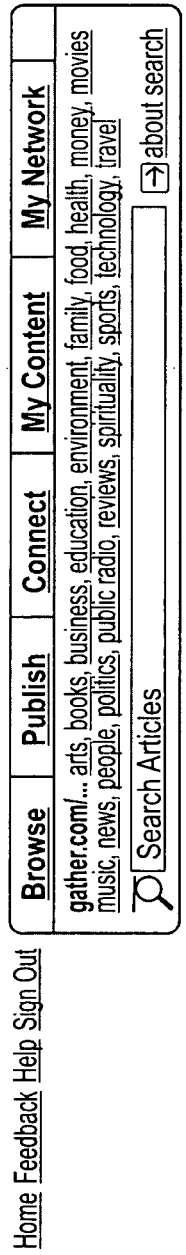
Figure 61:
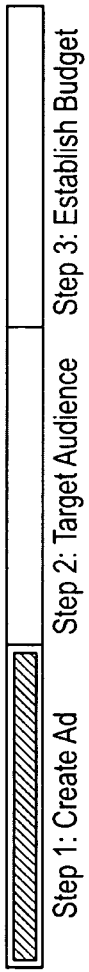

FIG. 6h illustrates the web page 150 enabling the advertiser-user to manage campaigns. Campaigns are listed by name, status, daily budget, number of clicks to date, click through rate (CTR %), average cost and total cost. Operational elements (e.g., "buttons") enable the advertiser-user to start and stop campaigns as desired. The starting and stopping of campaigns as instructed here by the advertiser-user is effected through ad records in database 110. In particular, setting of variables, flags and any of various known techniques for handling ad records may be employed. Web page 150 also lists customer profiles by name. This allows the advertiser-user to view and edit a Customer Profile as well as to add (create) a new Customer (ad targeting) Profile as further illustrated in FIG. 6j discussed below.

To create additional ads, system 100 displays web page 152 to the advertiser-user as illustrated in FIG. 6i. Web page 152 provides campaign name, subject advertisement name and subject ad information fields similar to screen/page 134 for creating a first ad in FIG. 6b. Also the steps of targeting an audience for the ad and establishing a budget follow (are similar to) those described in FIGS. 6c and 6e.

In FIG. 6j, the web page 154 enables the advertiser-user to review previously created customer (ad targeting) profiles and to create new ones. Web page 154 lists customer profiles by name and displays a summary of each as supported by corresponding recorded data in ad database 110.

Figure 6K:
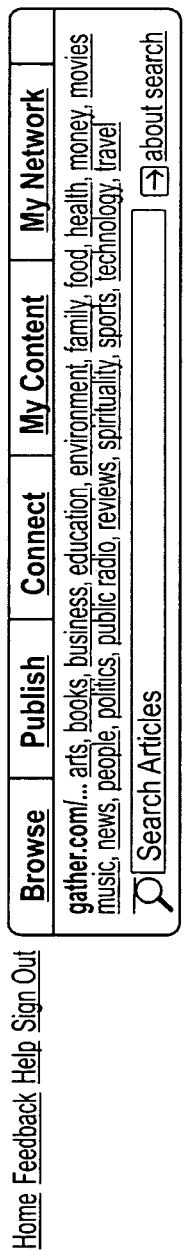

FIG. 6k illustrates the web page 156 that enables an advertiser-user to review his ads. Each ad is listed by name with an indication of corresponding campaign, ad status, CPC bid and actual cost-per-click being charged for this ad as supported by corresponding stored ad data in database 110. Advertiser-user selection of an ad listed on this screen view/page 156 enables the advertiser-user to modify the ad and its corresponding budget CPC amounts and the like. For each of the advertiser-user entered edits throughout screen views 148, 150, 152, 154 and 156, system 100 updates corresponding attributes and records in database 110. Moreover, data used in reports and screen views of FIGS. 6g-6k are tracked by system 100 and/or ad system 99 and are stored (updated) in ad database 110, supporting tables and/or user profiles 17.

While this invention has been particularly shown and described with references to preferred embodiments thereof, it will be understood by those skilled in the art that various changes in form and details may be made therein without departing from the scope of the invention encompassed by the appended claims.

For example, the foregoing states exemplary code and algorithms for implementing an embodiment of the present invention. These are by way of illustration and not limitation. Other code language and equivalent computations are suitable.

What is claimed is:

1. A method of real time customization of a web page at a host computer site hosting a computer-based social network of users, the method comprising:
   (i) obtaining demographic information of a subject end-user of the host computer site provided by the subject end-user, said obtaining being by one or more computer servers of the host computer site;
   (ii) forecasting further demographic information of the subject end-user based on relationships of the subject end-user with other users of the host computer site and based on respective demographic information of the other users of the host computer site, said forecasting resulting in forecasted further demographic information including age or gender of the subject end-user, said forecasting being by the one or more computer servers and being automatically implemented;
   (iii) recording, by the one or more computer servers, classification keywords of authored works read, written or published by the subject end-user, and recording indications of corresponding frequency or recency of use by the subject end-user of the recorded classification keywords of said authored works, the classification keywords being keywords used by users at the host computer site to categorize authored works, wherein users include registered users of the host site and non-registered users of the host site, and authored works include works originated at the host site and works originated elsewhere;
   (iv) automatically generating and maintaining, by the one or more computer servers, a profile of the subject end-user by combining the recorded classification keywords of the subject end-user, the obtained demographic information provided by the subject end-user, and the forecasted further demographic information of the subject end-user, said combining considering the recorded indications of corresponding frequency or recency of use by the subject end user of the recorded classification keywords in forming the profile of the subject end-user, the host computer site supporting the generated and maintained profile with a set of tables;
   (v) indexing a plurality of paid third-party advertisements, each advertisement having respective keywords associated therewith, said indexing being by the one or more computer servers;
   (vi) filtering the indexed advertisements based on the generated and maintained profile of the subject end-user as supported by the tables to generate a plurality of filtered advertisements, said filtering being by the one or more computer servers;
   (vii) for each filtered advertisement in the plurality of filtered advertisements, assigning a priority to the filtered advertisements as a function of a rules-based score, the rules-based score being based on at least the generated and maintained profile of the subject end-user, said assigning being by the one or more computer servers assigning a different priority to different filtered advertisements;
   (viii) in response to user selection of a web page, customizing the web page in real time with a highest priority filtered advertisement of the plurality of filtered advertisements, said customizing being by the one or more computer servers; and
   (ix) delivering the customized web page to the subject end-user such that the highest priority filtered advertisement is displayed with the customized webpage by the one or more computer servers.

2. A method as claimed in claim 1 wherein obtaining demographic information includes providing an on-line form for completion by the subject end-user.

3. A method as claimed in claim 1 wherein forecasting further demographic information of the subject end-user includes determining a Zip Code for the subject end-user based on Zip Codes detected in activity of the subject end-user.

4. A method as claimed in claim 1, wherein the recorded classification keywords further include:
   classification keywords associated with content browsed by the subject end-user.

5. A method as claimed in claim 4 further comprising expiring recorded classification keywords based on respective recency or frequency.

6. A computer implemented method of real time customization of a web page at a host site hosting a computer-based social network of users, the method comprising:
   obtaining, by one or more computer servers of the host site, demographic information from end-users of the host site using on-line means, said obtaining resulting in obtained end-user provided demographic information, one of the end-users being a subject end-user;
   forecasting further demographic information of the subject end-user based on relationships of the subject end-user with other end-users of the host computer site and based on respective demographic information of the other end-users of the host computer site, said forecasting resulting in forecasted further demographic information including age or gender of the subject end-user, said forecasting being by the one or more computer servers of the host site and being automatically implemented;

recording, by the one or more computer servers of the host site, keyword data for each end-user among at least a subset of the end-users, the subset including the subject end-user, said recording for a respective end-user including recording: (a) classification keywords of authored works read, written or published by the respective end-user, the classification keywords being keywords used by end-users at the host site to categorize authored works, and (b) indications of a corresponding frequency or recency of use by the respective end user of the recorded classification keywords of the authored works, wherein the end-users include registered users of the host site and non-registered users of the host site, and authored works include works originated at the host site and works originated elsewhere;

indexing a plurality of paid third party advertisements, each of the plurality of advertisements having respective keywords associated therewith, said indexing being by the one or more server computers of the host site;

prioritizing, for the subject end-user one of the plurality of indexed third party advertisements, said prioritizing being by the one or more computer servers of the host site, and being based on a comparison of (i) a combination of the recorded classification keywords of the subject end-user, the obtained subject end-user provided demographic information, and the forecasted further demographic information to (ii) the keywords associated with the one indexed third party advertisement, resulting in a subject end-user prioritized advertisement, wherein the combination is in accordance with the recorded indications of frequency or recency of use by the subject end user or the recorded classification keywords;

in response to the subject end-user selection of a web page, customizing the web page in real time with the subject end-user prioritized advertisement, said customizing being by the one or more computer servers of the host site; and delivering the customized web page to the subject end-user such that the subject end-user prioritized advertisement is displayed on the customized web page by the host site.

7. A method as claimed in claim 6 wherein the combination is advertiser defined.

8. A method as claimed in claim 6 further comprising obtaining bid amounts for projected audience reach where audience reach is an estimated number of end-users the subject end-user prioritized advertisement is determined to be targeted for.

9. A method as claimed in claim 8 wherein obtaining bid amounts includes utilizing a graphical user interface having a user-controlled sliding view of estimated the number of end-users viewing or selecting per day as graphed against cost per view.

10. A method as claimed in claim 8, wherein obtaining bid amounts includes:
receiving input dollar amount per number of views, and
in response, indicating likely number of impressions resulting and average placement of the subject end-user prioritized advertisement for the input dollar amount.

11. A method as claimed in claim 10, wherein receiving input dollar amount is per number of sales completed or per registration completed.

12. A method as claimed in claim 8, wherein obtaining bid amounts includes:
receiving input dollar amount per click-through, and
in response, indicating likely number of click-throughs resulting, average placement of the subject end-user prioritized advertisement and total cost of the subject end-user prioritized advertisement.

13. A method as claimed in claim 8 wherein the comparison further includes the one or more server computers of the host site comparing said one indexed third party advertisement relative to other indexed third party advertisements with respect to financial reward to the host site or ad serving network that makes determination of end-users to target advertisements to.

14. A method as claimed in claim 8, wherein obtaining bid amounts employs a Vickrey style auction.

15. A method as claimed in claim 14 wherein the bid amounts are one of cost per click, cost per view or cost per acquisition made of item being advertised.

16. A method as claimed in claim 8, wherein obtaining bid amounts includes focusing on a certain author or specific story for higher bid amounts.

17. A computer implemented method of real time customization of a web page at a host site of a computer-based social network of users, the method comprising:
obtaining, by one or more computer servers of the host site, demographic information of a subject end user of the host site from the subject end-user, said obtaining resulting in obtained end-user provided demographic information;

forecasting further demographic information for the subject end-user based on relationships of the subject end-user with other end-users in the computer-based social network and respective demographic information of the other end-users, said forecasting resulting in forecasted further demographic information including age or gender of the subject end-user, said forecasting being by the one or more computer servers of the host site;

recording, by the one or more computer servers of the host site, classification keywords of authored works read, written or published by the subject end-user, and recording, by the one or more computer servers of the host site, indications of corresponding frequency or recency of use by the subject end user of the recorded classification keywords of said authored works, the classification keywords being keywords used by end-users at the host site to categorize authored works, wherein the end-users include registered users of the host site and non-registered users of the host site, and authored works include works originated at the host site and works originated elsewhere;

indexing a plurality of paid third-party advertisements having respective keywords associated therewith, said indexing being by the one or more computer servers of the host site;

filtering the plurality of indexed advertisements based on the obtained demographic information provided by the subject end-user and the forecasted further demographic information for the subject end-user, said filtering being by the one or more computer servers of the host site;

prioritizing the filtered advertisements as a function of a rules-based score, the rules-based score being based on a combination of: (a) the obtained demographic information of the subject end-user, (b) the forecasted further demographic information of the subject end-user, (c) the recorded classification keywords of the subject end-user, and (d) the recorded indications of frequency or recency of use by the subject end user of the recorded classification keywords, resulting in a prioritized order of the plurality of filtered advertisements, said prioritizing being by the one or more computer servers of the host site;

in response to user selection of a webpage, customizing the webpage in real time with a highest priority filtered advertisement from the prioritized order of the plurality of filtered advertisements, said customizing being by the one or more computer servers of the host site; and displaying to the subject end-user the customized web page with at least the highest priority filtered advertisement.

18. A method as claimed in claim 17, wherein prioritizing further includes selecting and ordering the plurality of filtered advertisements in the prioritized order based on respective bid amounts of the plurality of filtered advertisements.

19. A method as claimed in claim 17 further comprising projecting respective likelihood of the subject end-user selecting plurality of filtered advertisements in the prioritized order, wherein the rules-based score is further based on the respective projected likelihood.

20. A method as claimed in claim 19, wherein the rules-based score is further based on a function of respective projected likelihood multiplied by respective bid amount.

21. A method as claimed in claim 20 wherein the rules-based score is further based on degrading the respective projected likelihood of the subject end-user selecting the plurality of filtered advertisements in the prioritized order every N times one of the plurality of filtered advertisements is viewed by the subject end-user and not selected by the end-user, N being a number greater than zero.

22. A method as claimed in claim 17 further comprising reporting to advertisers indications of the advertisements displayed and selected by end-users.

23. A method as claimed in claim 22, wherein reporting includes reporting to advertisers any combination of number of sales, number of subscriptions, number of registrations made by end-users through respective advertisements.

24. A method as claimed in claim 22, wherein reporting includes filtering reports by demographics, keywords, category, context and end-user behavior.

25. A method as claimed in claim 22, wherein reporting includes showing a breakdown on reports by demographics, keywords, phrase, category, context and end-user behavior.

26. A method as claimed in claim 17 further comprising obtaining end-user ratings of the highest priority filtered advertisements.

27. A method as claimed in claim 26, wherein end-user ratings are obtained only from end-users who selected the displayed highest priority filtered advertisement or end-users who made a purchase through the displayed highest priority filtered advertisement.

28. A method as claimed in claim 17 wherein the paid third-party advertisements are indexed by any of: advertiser type, product type, geographic region, product cost range, language and keywords.

29. A method as claimed in claim 28 further comprising displaying to the subject end-user an option to view other similar advertisements based on categorization of the advertisements in the prioritized order of the plurality of filtered advertisements.

30. A method as claimed in claim 29 wherein upon end-user selection of the option to view other similar advertisements, one or more similar advertisements are displayed and at least one advertisement of the prioritized order of the plurality of filtered advertisements remains visible.

31. A method as claimed in claim 29 wherein displaying the option to view other similar advertisements includes
   (i) enabling the subject end-user to respond to the other similar advertisements, or
   (ii) for each similar advertisement, providing a respective option to display more advertisements similarly categorized.

32. A method as claimed in claim 29 further comprising enabling advertisers to (i) bid additional money to prevent display of the option or (ii) pay a fee to remove display of the option.

33. A method as claimed in claim 17 wherein the prioritized order of the plurality of filtered advertisements includes advertisements that the subject end-user has previously seen, and advertisements that the subject end-user has responded to.

34. A method as claimed in claim 33 further including displaying to the subject end-user an option to display advertisements previously viewed or responded to by the subject end-user.

35. A method as claimed in claim 33 further including displaying to the subject end-user the advertisements previously viewed or responded to by the subject end-user.

36. A method as claimed in claim 33 further comprising enabling other users to see the advertisements that the subject end-user has responded to.

37. A method as claimed in claim 33 further comprising enabling the subject end-user to see advertisements that other users connected to the subject end-user have responded to.

38. A method as claimed in claim 33 further comprising enabling the subject end-user to see, aggregated in a single place, advertisements recently viewed by those linking to the subject end-user.

39. A method as claimed in claim 33 further comprising sorting advertisements by popularity.

40. A method as claimed in claim 33 further comprising enabling the subject end-user to sort advertisements previously viewed by another user or group, said sorting being by advertiser, product type, recency or frequency of viewing, or advertiser ranking or rating.

41. A method as claimed in claim 40 wherein a default sorting for the subject end-user is applied.

42. A method as claimed in claim 33 further comprising enabling the subject end-user to determine whether other users can see what advertisements the subject end-user has viewed.

43. A method as claimed in claim 33 wherein the filtered advertisements omit advertisements of a certain type.

44. A computer system providing real time customized web pages in a computer-based social network of users having a host site operable on a global network, the computer system comprising:
   at least one computer server coupled through the global network to client computers associated with end-users, the at least one computer server is configured to:
      obtain demographic information about a subject end-user of the host site provided by the subject end-user through the global network;

forecast further demographic information of the subject end-user based on relationships of the subject end-user with other users in the computer-based social network and respective demographic information of said other users in the computer-based social network, said forecasting resulting in forecasted further demographic information including age or gender of the subject end-user;

record classification keywords of authored works read, written or published by the subject end-user, the classification keywords being keywords used by users in the computer-based social network to categorize authored works, and record indications of corresponding frequency or recency of use by the subject end-user of the recorded classification keywords of said authored works, wherein the users include registered users of the computer-based social network and non-registered users of the computer-based social network, and authored works include works originated at the host site and works originated elsewhere;

automatically generate and maintain a profile of the subject end-user by combining: (a) the recorded classification keywords of the subject end-user, (b) the obtained demographic information provided by the subject end-user, and (c) the forecasted further demographic information of the subject end-user, there being a set of tables supporting the generated and maintained profile, wherein the combining considers the recorded indications of frequency or recency of use by the subject end-user of the obtained classification keywords;

index a plurality of paid third-party advertisements, each advertisement-having respective keywords associated therewith;

filter the indexed advertisements based on the generated and maintained profile of the end-user as supported by the tables, said filtering generating a plurality of filtered advertisements;

for each filtered advertisement in the generated plurality of filtered advertisements, assign a priority to the filtered advertisement as a function of a rules-based score, the rules-based score being based on at least the generated and maintained profile of the subject end-user, a different priority being assigned to different filtered advertisements;

in response to user selection of a web page, customize the web page in real time with a highest priority filtered advertisement of the plurality of filtered advertisements; and deliver the customized web page to the subject end-user such that the highest priority filtered advertisement of the plurality of filtered advertisements is displayed to the subject end-user of the host site.

45. A computer system as in claim 44 wherein the at least one computer server is further configured to:
determine social network groups to which the subject end-user belongs;
obtain keywords associated with the determined groups, wherein the obtained keywords associated with the determined groups are further combined in the generated profile for the subject end-user.

46. A computer system as in claim 44 wherein the at least one computer server is further configured to:
determine end-users, other than the subject end-user, having a relationship with the subject end-user; and
forecast further demographic information of the subject end-user using demographic information of the determined end-users and using types of relationships between the subject user and the determined end-users, wherein the forecasted further demographic information is further combined in the generated profile for the subject end-user.

47. A computer system as in claim 44 wherein the obtained demographic information includes the subject end-user's age or gender.

48. A computer system as in claim 44 wherein the at least one computer server is further configured to:
track the subject end-user's responses to displayed advertisements.

49. A non-transitory computer-readable medium storing computer software instructions for real time customization of a web page in a computer-based social network of users having a host site operable on a global network, the computer software instructions when executed by a processor cause an apparatus to:

obtain demographic information of end-users of the host site through the global network;

forecast further demographic information of the end-users based on relationships of the end-users with other end-users in the computer-based social network and based on respective demographic information of the other end-users in the computer-based social network, said forecasting resulting in forecasted further demographic information including one or more of age or gender of at least one end-user;

record, for each end-user among at least a subset of the end-users, classification keywords of authored works read, written or published by the end-user, and record indications of corresponding frequency or recency of use by the end-user of the recorded classification keywords, the classification keywords are keywords used by users at the host site to categorize authored works, wherein the end-users include registered users of the host site and non-registered users of the host site, and the authored works include works originated at the host site and works originated elsewhere;

generate and maintain a profile of a given end-user by combining: (a) the recorded classification keywords of the given end-user, (b) the obtained demographic information of the given end-user, and (c) the forecasted further demographic information of the given end-user, there being a set of tables supporting the generated and maintained profile, said combining considering the recorded indications of corresponding frequency or recency of use by the given end-user of the recorded classification keywords in forming the profile of the given end-user;

index a plurality of paid third-party advertisements having respective keywords associated therewith;

filter the indexed advertisements based on the generated and maintained profile of the given end-user as supported by the tables to generate a plurality of filtered advertising content;

prioritize the plurality of filtered advertising content as a function of a rules-based score, the rules-based score being based on at least the generated and maintained profile of the given end-user, resulting in a prioritized order of the plurality of filtered advertising content;

in response to user selection of a web page, customize the web page in real time with a highest priority one of the plurality of filtered advertising content from the prioritized order; and deliver the customized web page to the given end-user such that the highest priority one of the plurality of filtered advertising content is displayed to the given end-user at the host site.

* * * * *